(12) United States Patent
Kuribayashi

(10) Patent No.: US 11,716,539 B2
(45) Date of Patent: Aug. 1, 2023

(54) IMAGE PROCESSING DEVICE AND ELECTRONIC DEVICE

(71) Applicant: NIKON CORPORATION, Tokyo (JP)

(72) Inventor: Hidenori Kuribayashi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 38 days.

(21) Appl. No.: 17/217,582

(22) Filed: Mar. 30, 2021

(65) Prior Publication Data

US 2021/0218892 A1 Jul. 15, 2021

Related U.S. Application Data

(62) Division of application No. 16/493,235, filed as application No. PCT/JP2018/009648 on Mar. 13, 2018, now Pat. No. 10,992,861.

(30) Foreign Application Priority Data

Mar. 14, 2017 (JP) ................................ 2017-048861

(51) Int. Cl.
*H04N 23/60* (2023.01)
*H04N 23/698* (2023.01)
*H04N 23/63* (2023.01)

(52) U.S. Cl.
CPC ......... *H04N 23/698* (2023.01); *H04N 23/633* (2023.01)

(58) Field of Classification Search
CPC ......... H04N 5/23238; H04N 5/232939; H04N 23/698; H04N 23/633
See application file for complete search history.

(56) References Cited

U.S. PATENT DOCUMENTS

2008/0084503 A1* 4/2008 Kondo .................... G06F 16/51
382/103
2011/0216159 A1 9/2011 Yoshizumi
(Continued)

FOREIGN PATENT DOCUMENTS

CN 102196173 A 9/2011
EP 2919106 * 9/2015 ........... G06F 3/0485
(Continued)

OTHER PUBLICATIONS

Jun. 12, 2018 International Search Report issued in International Patent Application No. PCT/JP2018/009648.
(Continued)

*Primary Examiner* — Mishawn N. Hunter
(74) *Attorney, Agent, or Firm* — Oliff PLC

(57) ABSTRACT

An image processing device includes: an input unit, first image data being a portion of an image with first and second photographic subjects being imaged being inputted therein, the second subject to be displayed after the first, and the first subject again to be displayed by repeating control to shift a portion of the image displayed upon the display unit in a first direction and to display a portion not displayed; and an image generation unit generating, from the first image data, second image data including the first and second subjects, and the second subject is arranged towards the first direction from the first subject, if a first distance by which the image displayed shifts from the first subject being displayed until the second subject is displayed is longer than a second distance by which the image displayed shifts from the second subject until the first subject is displayed.

7 Claims, 13 Drawing Sheets

(56) References Cited

U.S. PATENT DOCUMENTS

| | | | |
|---|---|---|---|
| 2015/0371088 A1* | 12/2015 | Hao | G06T 7/246 |
| | | | 382/103 |
| 2016/0240009 A1* | 8/2016 | Lyren | H04N 7/157 |
| 2017/0213108 A1* | 7/2017 | Bergsma | G06T 7/74 |
| 2017/0316610 A1* | 11/2017 | Lin | G06T 19/006 |

FOREIGN PATENT DOCUMENTS

| | | | |
|---|---|---|---|
| JP | 2000-324386 A | 11/2000 |
| JP | 2004-201231 A | 7/2004 |
| JP | 2006-211105 A | 8/2006 |
| JP | 2006-287942 A | 10/2006 |
| JP | 2011-040898 A | 2/2011 |
| JP | 2011-188163 A | 9/2011 |
| JP | 2012-119804 A | 6/2012 |
| JP | 2012-175138 A | 9/2012 |

OTHER PUBLICATIONS

Oct. 10, 2020 Office Action issued in Chinese Patent Application No. 201880030968.5.
Dec. 30, 2020 Notice of Allowance issued in U.S. Appl. No. 16/493,235.

\* cited by examiner (a)

(b)

(c)

(a)

(b)

(a)

(b)

(c)

(d)

(e)

(f)

(a)

(b)

(c)

(d)

(a)

(b)

(a)

(b)

(a)

(b)

IMAGE PROCESSING DEVICE AND ELECTRONIC DEVICE

This is a Divisional of U.S. patent application Ser. No. 16/493,235 filed May 19, 2020 (now U.S. Pat. No. 10,992,861), which in turn is a national phase of International Patent Application No. PCT/JP2018/009648 filed Mar. 13, 2018, which claims priority to Japanese Patent Application No. 2017-048861 filed Mar. 14, 2017. The disclosures of the prior applications are hereby incorporated by reference herein in their entireties.

TECHNICAL FIELD

The present invention relates to an image processing device and to an electronic device.

BACKGROUND ART

A camera that performs cutting out, display and recording of a portion of a photographic image photographed by an ultra wide angle camera is per se known (for example, refer to PTL1).

CITATION LIST

Patent Literature

PTL1: Japanese Laid-Open Patent Publication No. 2012-119804.

SUMMARY OF INVENTION

According to a first aspect, an image processing device, comprises: an input unit through which are inputted first image data which is a portion of an image in which a first photographic subject and a second photographic subject are imaged, and which is employed for the second photographic subject to be displayed after the first photographic subject has been displayed, and for the first photographic subject then again to be displayed upon the display unit by repeating control to shift a portion of the image displayed upon the display unit in a first direction and to display a portion of the image that is not displayed upon the display unit; and an image generation unit that generates, from the first image data, second image data including the first photographic subject and the second photographic subject, and in which the second photographic subject is arranged towards the first direction from the first photographic subject, if a first distance by which the image displayed upon the display unit shifts from the first photographic subject being displayed upon the display unit until the second photographic subject is displayed upon the display unit is longer than a second distance by which the image displayed upon the display unit shifts from the second photographic subject being displayed upon the display unit until the first photographic subject is displayed upon the display unit.

According to a second aspect, an image processing device, comprises: an input unit through which are inputted first image data which is a portion of an image in which a first photographic subject and a second photographic subject are imaged, and which is employed for the second photographic subject to be displayed after the first photographic subject has been displayed, and for the first photographic subject then again to be displayed upon the display unit by repeating control to shift a portion of the image displayed upon the display unit in a first direction and to display a portion of the image that is not displayed upon the display unit; and an image generation unit that generates, from the first image data, second image data including the first photographic subject and the second photographic subject, based on a first distance by which the image displayed upon the display unit shifts from the first photographic subject being displayed upon the display unit until the second photographic subject is displayed upon the display unit, and a second distance by which the image displayed upon the display unit shifts from the second photographic subject being displayed upon the display unit until the first photographic subject is displayed upon the display unit According to a third aspect, an electronic device, comprises: a display unit that displays an image in which a first photographic subject and a second photographic subject are imaged; a control unit that displays the second photographic subject after the first photographic subject has been displayed, and then again displays the first photographic subject upon the display unit, by repeating control to shift a portion of the image displayed upon the display unit in a first direction and to display a portion of the image that is not displayed upon the display unit; and an image generation unit that generates image data including the first photographic subject and the second photographic subject, and in which the second photographic subject is arranged towards the first direction from the first photographic subject, if a first distance by which the image displayed upon the display unit shifts from the first photographic subject being displayed upon the display unit until the second photographic subject is displayed upon the display unit is longer than a second distance by which the image displayed upon the display unit shifts from the second photographic subject being displayed upon the display unit until the first photographic subject is displayed upon the display unit.

According to a fourth aspect, an electronic device, comprises: a display unit that displays first image data in which a first photographic subject and a second photographic subject are imaged; a control unit that displays the second photographic subject after the first photographic subject has been displayed, and then displays the first photographic subject again upon the display unit, by repeating control to shift a portion of the first image data displayed upon the display unit in a first direction and to displays a portion of the first image data that is not displayed upon the display unit; and an image generation unit that generates, from the first image data, second image data in which the first photographic subject and the second photographic subject are arranged based on a first distance by which the image displayed upon the display unit shifts from the first photographic subject being displayed upon the display unit until the second photographic subject is displayed upon the display unit, and a second distance by which the image displayed upon the display unit shifts from the second photographic subject being displayed upon the display unit until the first photographic subject is displayed upon the display unit.

According to a fifth aspect, an image processing device, comprises: an input unit through which is inputted an all-around image including a first photographic subject and a second photographic subject that have been imaged by an imaging unit; and an image generation unit that takes a direction from the first photographic subject towards the second photographic subject as being a first direction in a partial image of the all-around image in which the first photographic subject, the second photographic subject, and a third photographic subject that is present in a shortest path from the first photographic subject to the second photographic subject are included, and generates from the all around-image an image that includes the first photographic subject and the second photographic subject, and in which the second photographic subject is arranged towards the first direction from the first photographic subject.

According to a sixth aspect, an image processing device, comprises: an input unit through which is inputted an all-around image including a first photographic subject and a second photographic subject that have been imaged by an imaging unit; and an image generation unit that generates from the all-around image an image in which the first photographic subject and the second photographic subject are arranged based on a shortest path in the all-around image from the first photographic subject to the second photographic subject.

DESCRIPTION OF EMBODIMENTS

First Embodiment

Figure 1:
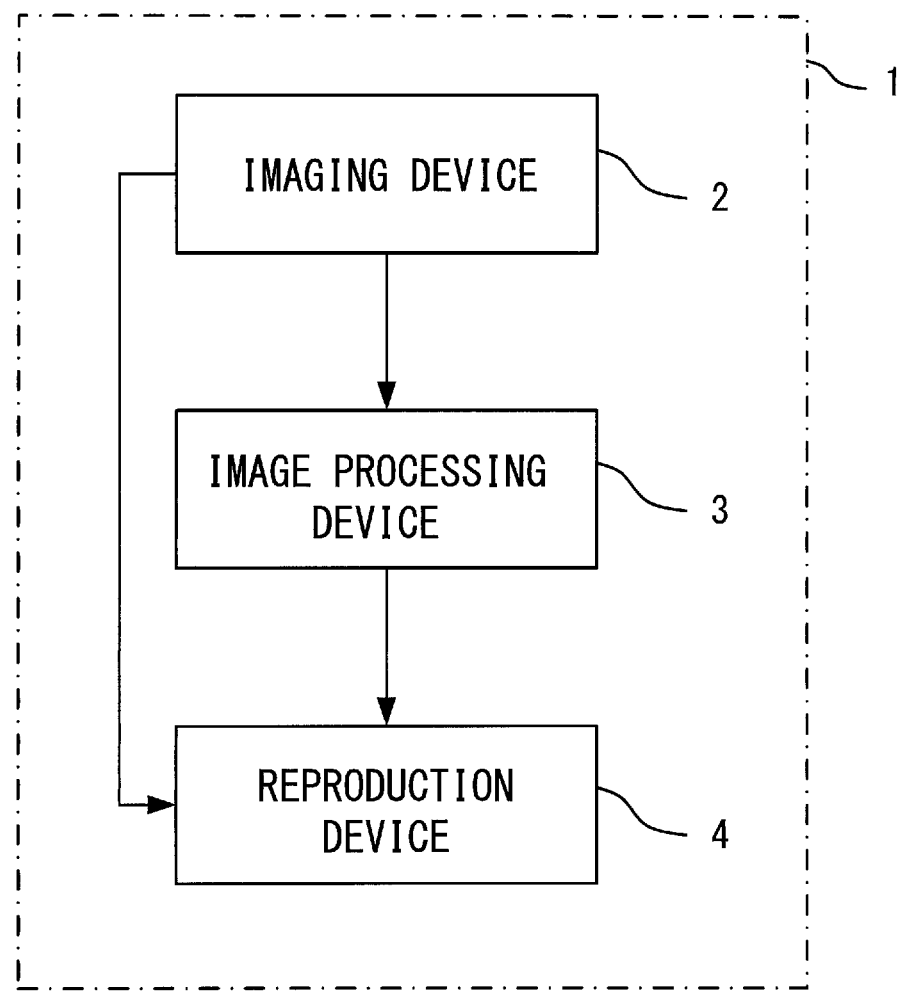
FIG. 1 is a block diagram schematically showing the structure of an image processing system.

FIG. 1 is a block diagram schematically showing the structure of an image processing system 1. This image processing system 1 comprises an imaging device 2, an image processing device 3, and a reproduction device 4. The imaging device 2 is an electronic device such as, for example, a digital camera, a smart phone, a tablet terminal, or the like. The image processing device 3 is an electronic device such as, for example, a digital camera, a smart phone, a tablet terminal, a personal computer, or the like. And the reproduction device 4 is an electronic device such as, for example, a digital camera, a smart phone, a tablet terminal, a personal computer, a digital photo frame, a head mounted display, or the like.

The imaging device 2 has a still image imaging function and a video imaging function. The still image imaging function is a function for capturing an omnidirectional or entire sphere image (as will be described hereinafter). And the video imaging function is a function for repeatedly capturing omnidirectional images and creating an omnidirectional video, each frame of which is one of these omnidirectional images. From this omnidirectional video that has been created by the imaging device 2, the image processing device 3 creates a two dimensional video (to be described hereinafter), each frame of which is a two dimensional image whose angle of view is narrower than that of the corresponding omnidirectional image. And the reproduction device 4 replays (or displays) omnidirectional images or two dimensional videos.

Explanation of the Imaging Device 2

Figure 2:
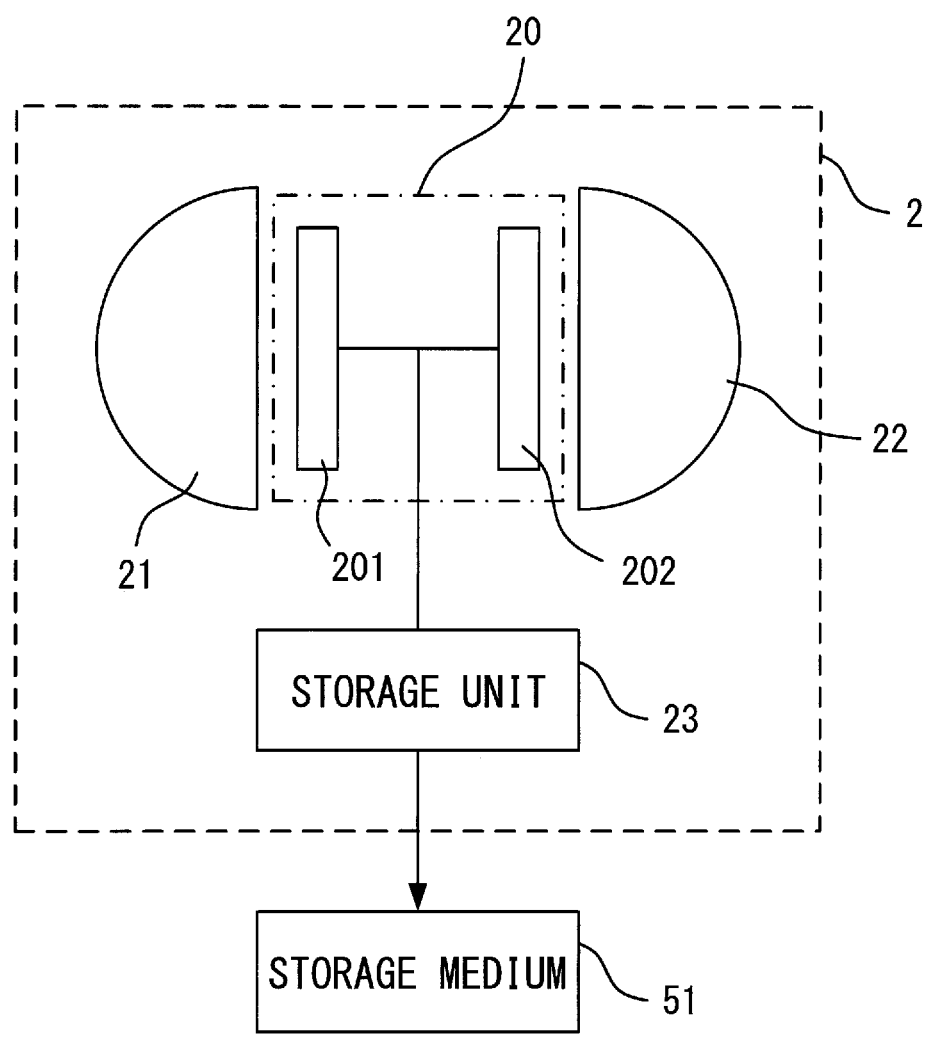
FIG. 2 is a block diagram schematically showing the structure of an imaging device.

FIG. 2 is a block diagram schematically showing the structure of the imaging device 2. The imaging device 2 comprises an imaging unit 20, a first image capturing optical system 21, a second image capturing optical system 22, and a storage unit 23. And the imaging unit 20 comprises a first imaging element 201 and a second imaging element 202.

The first image capturing optical system 21 and the second image capturing optical system 22 are so-called fisheye lenses. The first image capturing optical system 21 forms an image upon the imaging surface of the first imaging element 201 of a photographic subject over a hemispherical range. To put it in another manner, the first imaging element 201 is adapted to be capable of capturing an image over a range of 360° in the horizontal direction and over a range of 180° in the vertical direction. This image capturing range of the first imaging element 201 is termed the "first hemisphere".

And the second image capturing optical system 22 forms an image upon the imaging surface of the second imaging element 202 of a photographic subject over a hemispherical range that is different from the first hemispherical range. To put it in another manner, the second imaging element 202 is adapted to be capable of capturing an image over a range of 360° in the horizontal direction and 180° in the vertical direction. This image capturing range of the second imaging element 202 is termed the "second hemisphere".

Together, the first hemisphere and the second hemisphere make up a complete sphere. In other words, by employing the first imaging element 201 and the second imaging element 202, the imaging unit 20 forms an image over the range of a complete sphere, 360° in the horizontal direction and 360° in the vertical direction. In the following explanation, an image having an angle of view covering 360° in the horizontal direction and 360° in the vertical direction and that is obtained by photographing the range of a full sphere will be termed an "omnidirectional image".

When the user employs the still image photographic function, the storage unit 23 stores a single omnidirectional image that has been captured by the imaging unit 20 in a storage medium 51 (for example, a memory card or the like). And, when the user employs the video photographic function, the storage unit 23 stores an omnidirectional video made up from a plurality of omnidirectional images that have been repeatedly captured by the imaging unit 20 in the storage medium 51. As mentioned above, each of the frames of the omnidirectional video is an omnidirectional image. It should be understood that, although the storage medium 51 in FIG. 2 can be inserted into and removed from the imaging device 2, it would also be possible for the imaging device 2 to fixedly incorporate the storage medium 51.

Explanation of the Omnidirectional Image

Figure 3:
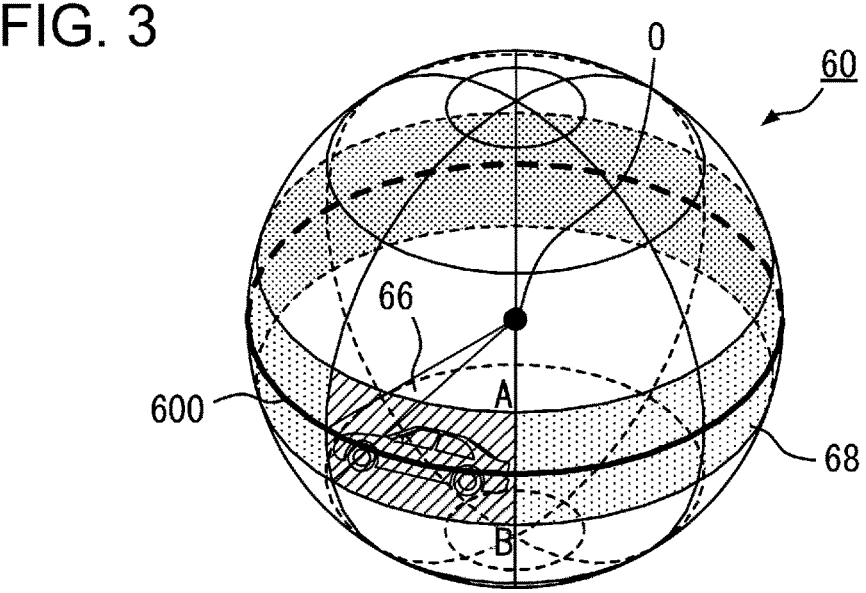
FIG. 3 shows schematic illustrations showing an image capturing range of an imaging unit and an omnidirectional image.
Figure 3:
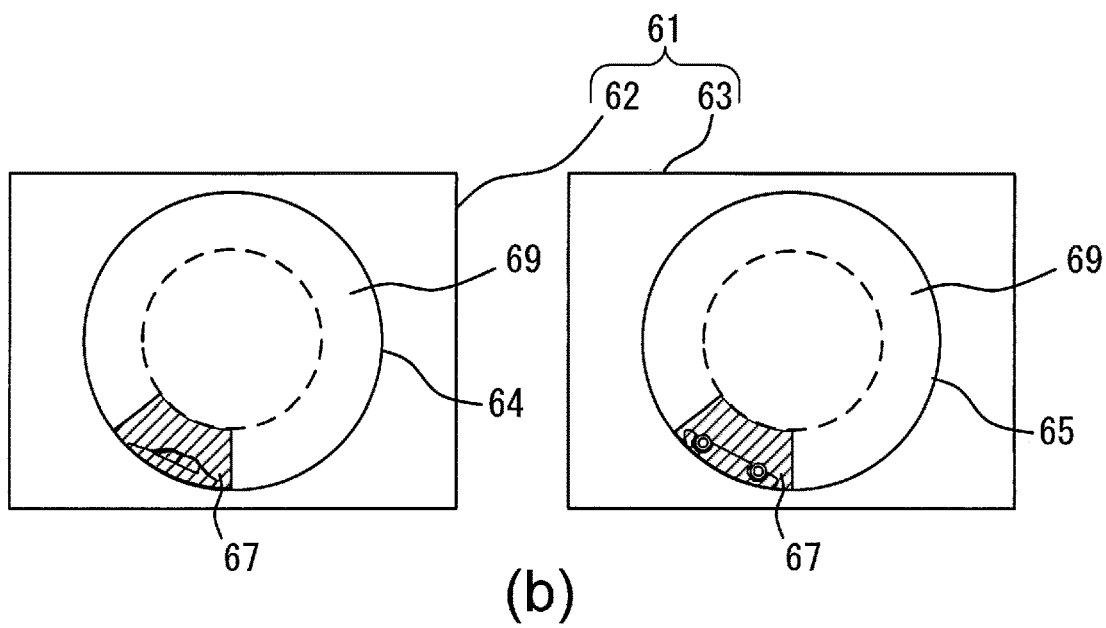
Figure 3:
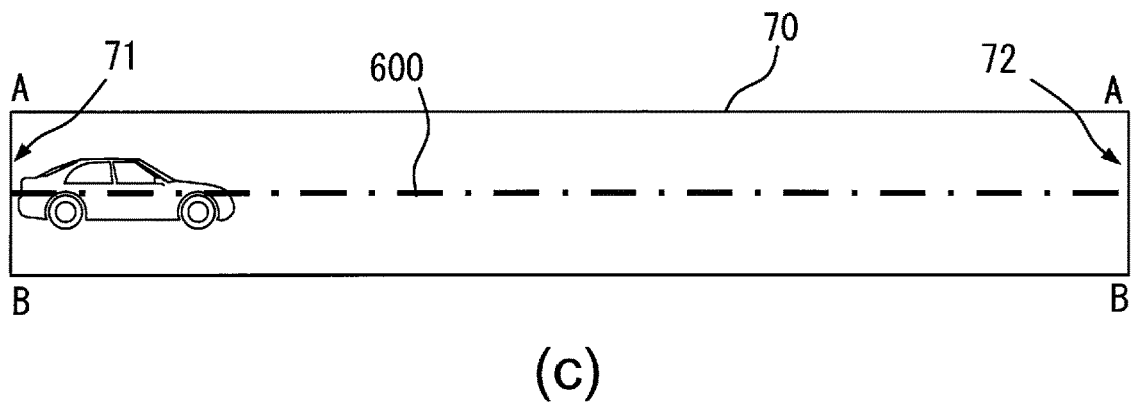

FIG. 3(a) is a schematic figure illustrating the image capturing range of the imaging unit 20. Taking the position of installation of the imaging unit 20 (i.e. the camera position) as the origin O, the imaging unit 20 captures an image over a full sphere 60 shown in FIG. 3(*a*). And FIG. 3(*b*) is a schematic figure showing an example of an omnidirectional image captured by the imaging unit 20. The omnidirectional image 61 shown by way of example in FIG. 3(*b*) includes a first hemispherical image 62 that has been captured by the first imaging element 201 and a second hemispherical image 63 that has been captured by the second imaging element 202. The first hemispherical image 62 includes a circular image 64 that is formed by the first image capturing optical system 21. And the second hemispherical image 63 includes a circular image 65 that is formed by the second image capturing optical system 22.

An image having any desired angle of view may be obtained by cutting out and deforming a portion of the omnidirectional image 61 shown by way of example in FIG. 3(*b*). For example, if it is desired to obtain an image having an angle of view 66 shown in FIG. 3(*a*), then a region 67 of FIG. 3(*b*) may be cut out and deformed into a rectangle. Moreover if, from the upper half hemisphere of the complete sphere as shown in FIG. 3(*a*), it is desired to obtain an image over a range 68 shown by the stippling in FIG. 3(*a*) that is described by carrying the line segment A-B around the sphere in the horizontal direction, then regions 69 of FIG. 3(*b*) may be cut out and deformed into a rectangle. An example of an image 70 obtained at this time is shown in FIG. 3(*c*). This image 70 is a panoramic landscape image. It should be understood that the left edge 71 and the right edge 72 of the image 70 shown by way of example in FIG. 3(*c*) are actually continuous with one another, as shown in FIG. 3(*a*). In other words, the image 70 shown as an example in FIG. 3(*c*) is an all-around image captured over a range of 360° around the imaging unit 20. This all-around image includes a path 600 that goes around the surface of the full sphere 60. The path 600 is a circumference of a circle centered upon the origin O and having the same diameter as the diameter of the full sphere 60. Since the origin O is the center of the full sphere 60, accordingly this circle coincides with the circumference of a cross section of the full sphere 60 sectioned by a plane passing through the center of the full sphere 60.

The length of the line segment A-B can be set arbitrarily. For example, by setting the point A to the so-called north pole and setting the point B to the so-called south pole, the range in the omnidirectional image 61 that is captured and the range in the all-around image 70 that is captured match one another. In other words, the all-around image may be called a projection (i.e. a mapping) of the omnidirectional image 61 onto a two dimensional image.

The image 70 shown as an example in FIG. 3(*c*) is an all-around image obtained by capturing a range of 360° around the horizontal direction of the imaging unit 20. Accordingly, the all-around image 70 includes the path 600 that corresponds to the so-called equator. This all-around image is not limited to running around the imaging unit 20 in the horizontal direction; it could be an image that is captured running over a range of 360° in any direction upon the imaging unit 20. For example, it would be possible for it to be an image that is captured running over a range of 360° around the imaging unit 20 along a meridian of the full sphere 60.

In the following explanation, for simplicity of description, the omnidirectional image is shown as being an all-around image captured over a range of 360° in the horizontal direction, by way of example, as shown in the example of FIG. 3(*c*). In other words, in the following explanation, the omnidirectional image is shown as though it were an image like the image 70 of FIG. 3(*c*), but actually the captured image is over the range of the full sphere 60 shown in FIG. 3(*a*).

It should be understood that the imaging unit 20 need not simply include two imaging elements, i.e. the first imaging element 201 and the second imaging element 202; it could also be provided with a larger number of imaging elements. By doing so, it would be possible to obtain an omnidirectional image even if a range over which each of the imaging elements is capable of capturing an image is more restricted than a full hemisphere. In other words it would be arranged, not to capture an image over the entire range of the full sphere 60 by combining the two imaging elements each of which captures an image over the range of a full hemisphere, but rather to capture an image over the entire range of the full sphere 60 by combining the three or more imaging elements each of which captures an image over a more restricted range. It would also be acceptable for parts of the image capturing ranges of the various imaging elements to overlap one another. For example, part of the image capturing range of the first imaging element 201 may overlap part of the image capturing range of the second imaging element 202. In a similar manner, the imaging device 2 need not only include two image capturing optical systems, i.e. the first image capturing optical system 21 and the second image capturing optical system 22; it would also be acceptable for it to be provided with a larger number of image capturing optical systems, each of which forms an image of the photographic subject over a more restricted range than a full hemisphere.

Furthermore, it would also be acceptable for the imaging unit 20 not to include two imaging elements, i.e. the first imaging element 201 and the second imaging element 202, but only a single imaging element. For example, by light from the first image capturing optical system 21 and light from the second image capturing optical system 22 being directed to a single imaging element by a mirror or the like, the circular image 64 and the circular image 65 may be captured by the single imaging element. By doing this, it is possible to reduce the number of imaging element components, so that a reduction in cost of the imaging unit 20 may be anticipated.

Explanation of the Image Processing Device 3

Figure 4:
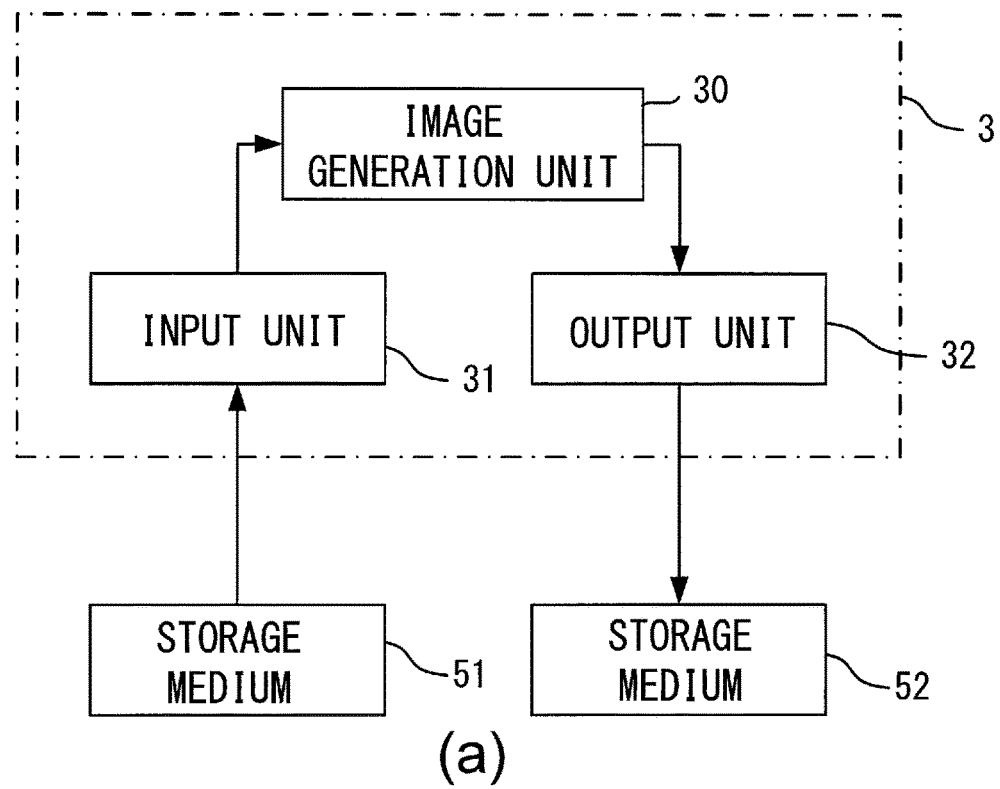
FIG. 4 shows block diagrams schematically showing the structure of an image processing device and the structure of a reproduction device.
Figure 4:
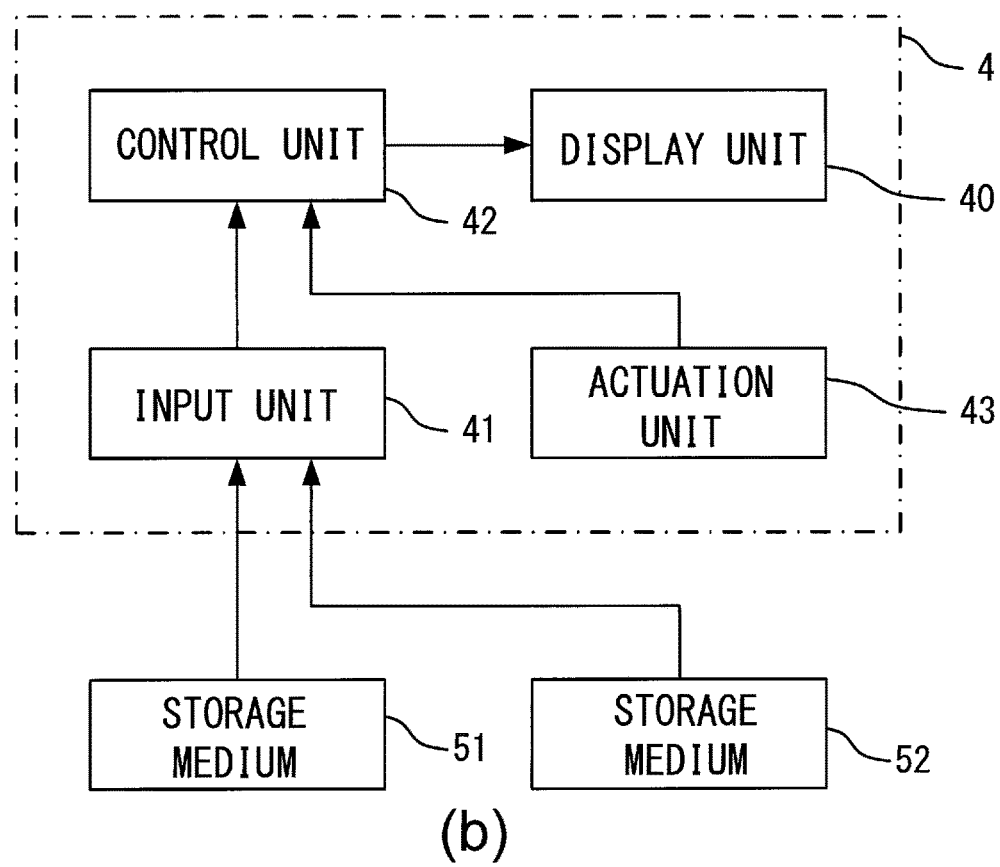

FIG. 4(*a*) is a block diagram schematically showing the structure of the image processing device 3. The image processing device 3 comprises an image generation unit 30, an input unit 31, and an output unit 32. The input unit 31 reads out an omnidirectional video from the storage medium 51 in which the omnidirectional video is stored, and inputs it into the image generation unit 30. The image generation unit 30 then performs processing for creation of a two dimensional video that will be described hereinafter upon the omnidirectional video that has thus been inputted. This processing to create a two dimensional video is processing that creates a two dimensional video from the omnidirectional video. In other words, the image generation unit 30 creates a two dimensional video from the omnidirectional video that has been inputted. The two dimensional video is a video in which each frame is made of an image that has a more restricted angle of view than that of the omnidirectional image. For example, the two dimensional video may have content equivalent to that of a video that has been captured by placing a conventional video camera having an angle of view of around 50° to 25° at the origin O in FIG. 3(*a*). The output unit 32 stores the two dimensional video that has been created by the image generation unit 30 in a storage medium 52. The storage medium 52 may be the same storage medium as the storage medium 51 in which the imaging device 2 has stored the omnidirectional video, or may be a different storage medium. It should be understood that although, in FIG. 4(a), the storage medium 51 and the storage medium 52 are shown as being provided outside the image processing device 3, it would also be acceptable for one or both of the storage medium 51 and the storage medium 52 to be housed internally to the image processing device 3. Moreover, the storage medium 51 and the storage medium 52 could also be adapted to be connected to the image processing device via a cable or wireless network. Alternatively, instead of the storage medium 51, it would also be possible to provide a structure in which the omnidirectional video is directly inputted from the imaging device 2 via a network.

Furthermore, each frame of a two dimensional video that has been created from an omnidirectional video may include, not only one image with a more restricted angle of view than that of the omnidirectional image, but rather two or more images with more restricted angles of view than that of the omnidirectional image.

Explanation of the Reproduction Device 4

FIG. 4(b) is a block diagram schematically showing the structure of the reproduction device 4. The reproduction device 4 comprises a display unit 40, an input unit 41, a control unit 42, and an actuation unit 43. The input unit 41 may read out an omnidirectional image from the storage medium 51 in which the omnidirectional image is stored, and may input it to the control unit 42. The input unit 41 may read out a two dimensional video from the storage medium 52 in which the two dimensional video is stored, and may input it to the control unit 42. And the control unit 42 displays the omnidirectional image or the two dimensional video that has thus been inputted upon the display unit 40. The display unit 40 may, for example, have a display screen that consists of a liquid crystal panel or the like. And, on the basis of control by the control unit 42, the display unit 40 displays the omnidirectional image or the two dimensional video upon its display screen. It should be understood that the storage medium 51 and the storage medium 52 shown in FIG. 4(b) may be provided externally to the reproduction device 4; but, alternatively, one or both of the storage medium 51 and the storage medium 52 may be housed internally to the reproduction device 4. The display unit 40, for example, may be a liquid crystal display of a smart phone, may be a liquid crystal display of a tablet terminal, or may be a head mounted display. Accordingly, if the entire region of an omnidirectional image is displayed at once upon the display unit 40, the range of all round 360° is being displayed on the two dimensional display so that it is difficult for the user visually to confirm the image. Therefore, there is a per se known method of reproduction in which part of the omnidirectional image having an angle of view of 360° is cut out, and only a part of the omnidirectional image is displayed upon the two dimensional plane of the display screen (i.e. of the display unit 40). In the following explanation, this method of displaying and reproducing only a part of the omnidirectional image upon the display unit 40 will be assumed as a precondition.

The actuation unit 43 is an operation member via which actuations by the user are inputted. In this embodiment, the actuation unit 43 is a touch sensor that is superimposed upon the display screen of the display unit 40. The actuation unit 43 detects the position at which a finger of the user or the like contacts the display screen, and transmits this position to the control unit 42. In other words, the actuation unit 43 detects touch actuation by the user and inputs the result to the control unit 42. Touch actuation may include, for example, scrolling operation in which the user contacts a finger or the like at a position upon the display screen and slides this finger or the like in the upward, downward, leftward, or rightward direction while keeping it in the contacted state and thereafter this finger or the like is no longer contacted to the display screen. In this embodiment, scrolling operation by the finger or the like moving leftward is termed "leftward scrolling operation".

Here, scrolling operation is an operation to shift the image displayed upon the display unit 40 in any desired direction upon the display unit 40.

Moreover, it may be arranged for the actuation unit 43 to be some type of actuation member other than a touch sensor. For example, if the reproduction device 4 is a head mounted display, then the user may also perform scrolling operation in the leftward direction by swinging his or her head leftward. In this case, the actuation unit 43 would be a sensor that detects displacement of the head mounted display (i.e. its orientation, its position, or the like) accompanying movement of the head of the user. The amount by which the image displayed upon the display unit 40 shifts corresponds to the amount of displacement of the head mounted display. For example, the image displayed upon the display unit 40 may be shifted rightward by the user performing the operation by swinging his or her head leftward.

It should be understood that the actuation member employed in the actuation unit 43 is not limited by those described above, provided that the image displayed upon the display unit 40 can be shifted in any desired direction upon the display unit 40.

Figure 5:
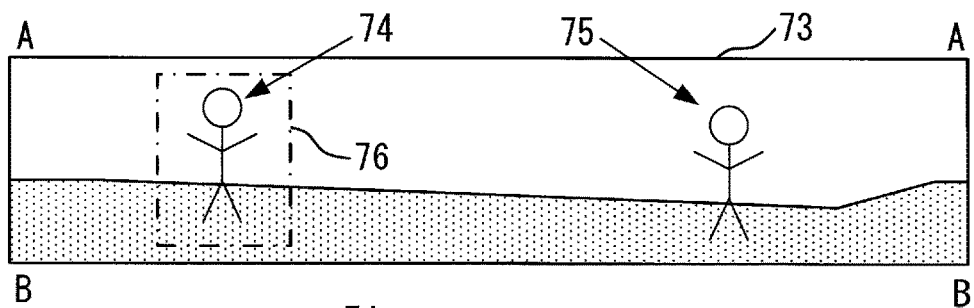
FIG. 5 shows figures for explanation of processing for reproduction of an omnidirectional image.
Figure 5:
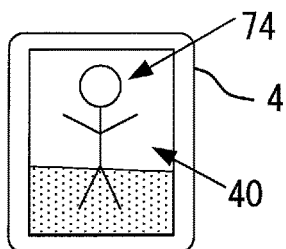
Figure 5:
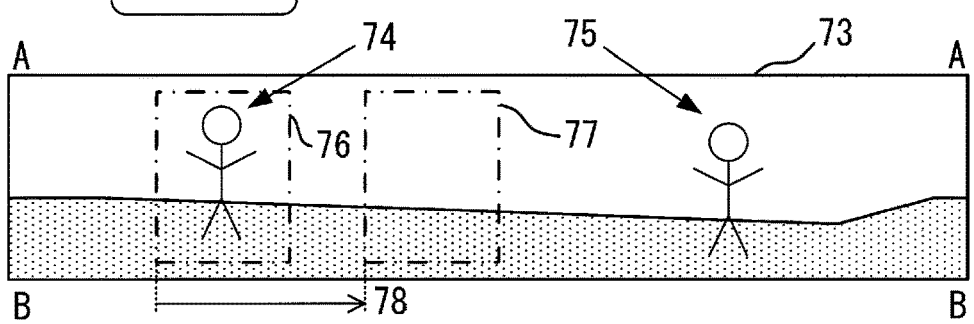
Figure 5:
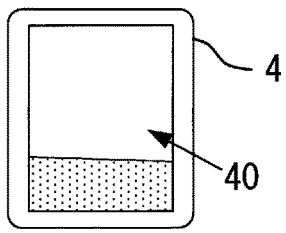
Figure 5:
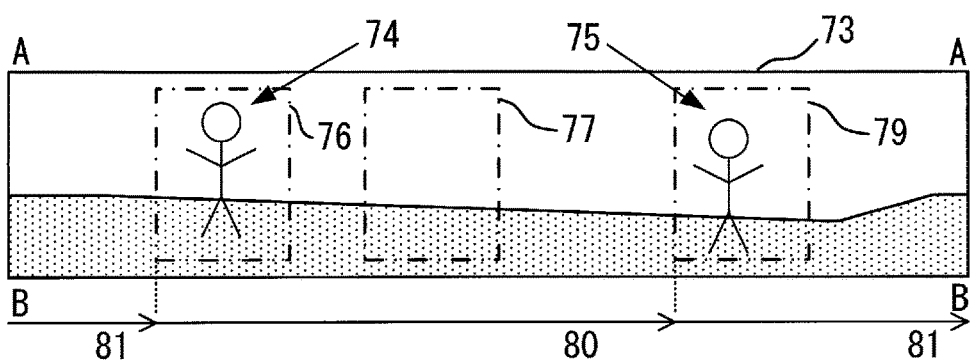
Figure 5:
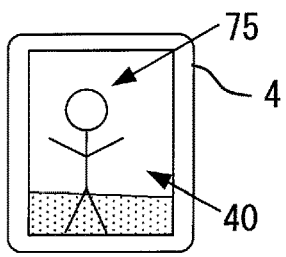

Now the processing for reproduction of the omnidirectional image by the reproduction device 4 (i.e. the display processing) will be explained. FIG. 5 shows figures for explanation of the reproduction processing for the omnidirectional image. FIG. 5(a), FIG. 5(c), and FIG. 5(e) are figures showing examples of an omnidirectional image 73 that is to be the subject of reproduction. This omnidirectional image 73 is an image in which a photographic subject 74 and a photographic subject 75 have been photographed. And FIG. 5(b), FIG. 5(d), and FIG. 5(f) are figures showing examples of screens displayed by the display unit 40 that is reproducing the omnidirectional image 73.

The control unit 42 cuts out a partial range 76 from the omnidirectional image 73 shown in FIG. 5(a) and displays it upon the display unit 40, as in FIG. 5(b). In FIG. 5(b), the display unit 40 is displaying the range 76 that includes the photographic subject 74. And, when the user performs leftward scrolling operation upon the screen, the control unit 42 shifts the portion of the omnidirectional image 73 displayed upon the display unit 40 in the leftward direction as shown in FIGS. 5(c) and 5(d), and performs control to cause a portion of the omnidirectional image 73 to be displayed that was not being displayed upon the display unit 40 at the time point 5(b). In other words, the control unit 42 replaces the image displayed upon the display unit 40, and changes it from the portion of the omnidirectional image 73 that was being displayed upon the display unit 40 to a different portion that is more to the right side of the omnidirectional image 73. To put it in another manner, the control unit 42 temporarily deletes the portion of the omnidirectional image 73 that is currently being displayed upon the display unit 40, and changes the range 76 shown in FIG. 5(a) to the range 77 shown in FIG. 5(c), so that a new portion of the omnidirectional image 73 that corresponds to the range 77 is now displayed upon the display unit 40. At this time, from the point of view of the user, it appears that the omnidirectional image 73 is shifted in the leftward direction by a distance 78. To put it in another manner, from the point of view of the user, it appears that the image displayed upon the display unit 40 is shifted leftward by the distance 78. Here, the distance 78 can be measured by units of the pixels making up the display unit 40. For example, by performing scrolling operation in the leftward direction of the screen by the minimum amount, the omnidirectional image 73 may be shifted in the leftward direction upon the display unit 40 by one pixel. The distance 78 can be defined in units of pixels by measuring by how many pixels the image has shifted until the range 77 is displayed upon the display unit 40. In the following explanation, the change from the display state shown in FIG. 5(a) and FIG. 5(b) to the display state shown in FIG. 5(c) and FIG. 5(d) will be expressed as "the image displayed upon the display unit 40 has shifted by the distance 78 in the leftward direction".

When the user repeatedly performs the scrolling operation in the leftward direction upon the screen, the control unit 42 repeats the control described above. As a result, as shown in FIG. 5(e) and FIG. 5(f), the control unit 42 comes to cut out a range 79 that includes the photographic subject 75, and to display that range upon the display unit 40. Since the left end and the right end of the omnidirectional image 73 are mutually continuous as described above, accordingly, when the user again repeats the leftward scrolling operation upon the screen, the control unit 42 again comes to display the photographic subject 74 upon the display unit 40. In other words, the contents displayed upon the display unit 40 again come to be the contents shown in FIG. 5(a) and FIG. 5(b).

As described above, the omnidirectional image 73 is a portion of an image in which the photographic subject 74 and the photographic subject 75 have been captured, and, is image data which is used, by repeating control to shift the portion of the omnidirectional image 73 that is displayed upon the display unit 40 in the leftward direction so as to display upon the display unit 40 portions of the omnidirectional image 73 that have not yet been displayed, so that the photographic subject 75 is displayed after the photographic subject 74 has been displayed, and then the photographic subject 74 is displayed upon the display unit 40 for a second time.

In this manner, a distance 80 (refer to (FIG. 5(e)) by which the image displayed upon the display unit 40 is shifted until the photographic subject 75 is displayed upon the display unit 40 by repeatedly performing the scrolling operation in the leftward direction upon the screen after the photographic subject 74 is displayed upon the display unit 40 is termed the distance from the photographic subject 74 to the photographic subject 75 in relation to the leftward direction. In a similar manner, a distance 81 (refer to (FIG. 5(e)) by which the image displayed upon the display unit 40 is shifted until the photographic subject 74 is displayed upon the display unit 40 by repeatedly performing the scrolling operation in the leftward direction upon the screen after the photographic subject 75 is displayed upon the display unit 40 is termed the distance from the photographic subject 75 to the photographic subject 74 in relation to the leftward direction.

In a similar manner in the case in which, from the state shown in FIG. 5(a) and FIG. 5(b), the user repeatedly performs scrolling operation, not in the leftward screen direction, but in the rightward screen direction, the photographic subject 75 is displayed after the photographic subject 74 has been displayed, and then the photographic subject 74 is again displayed for a second time upon the display unit 40. However, in the example shown in FIG. 5(a) and FIG. 5(b), if the photographic subject 75 is not positioned to the right of the photographic subject 74 but is positioned upward therefrom, then by performing scrolling operation, not in the leftward or rightward direction of the screen, but for example in the upward direction of the screen or the like, after the photographic subject 74 has been displayed, the photographic subject 74 disappears from the screen, and thereafter the photographic subject 75 is displayed, and then the photographic subject 74 comes to be displayed again for a second time. In other words, any two photographic subjects that have been photographed in the omnidirectional image 73 can be displayed as described above by keeping the direction of scrolling operation constant.

As described above, the reproduction device 4 of this embodiment cuts out a portion of the omnidirectional image having an angle of view of 360° in the vertical direction and in the horizontal direction, and reproduces this portion upon the display screen which is a two dimensional plane. In the above explanation the omnidirectional image is described as being a still image, but, by similar processing, it is also possible to reproduce an omnidirectional video of which each frame is an omnidirectional image. In this case, when the omnidirectional video is paused and then is replayed again, the situation is effectively the same as explained above. When an omnidirectional video is being reproduced, the only feature of difference is that the frames (i.e. the omnidirectional images) that make up the omnidirectional video change over time.

When an omnidirectional image is reproduced, it is possible for the user to display the main photographic subject upon the display unit 40 and to check it visually by performing scrolling operation in any desired direction. However since, when an omnidirectional video is replayed, each frame (i.e. each omnidirectional image) that makes up the omnidirectional video is only displayed upon the display unit 40 for an extremely short time interval, accordingly it is difficult to cause a portion that is not being displayed upon the display unit 40 of a given frame to be displayed. Normally, scrolling operation results in the control over the next frame to be displayed upon the display unit 40. As a result, there is a possibility that the user may, for example, overlook a scene in which a main photographic subject is executing a movement that ought to be noticed in a portion that is not currently being reproduced in the display screen. Furthermore, the user may not even notice the existence of a main photographic subject which he himself has not noticed in this omnidirectional video. Moreover, each time that the user views the video, it is necessary for him to adjust the display position by performing scrolling operation as described above, which is quite troublesome. Again, if for example two main photographic subjects of interest are moving at separate locations, then it is necessary for the user to replay the video several times in order to see both of them. Due to this, the burden upon the user during replay of an omnidirectional video is quite high. Accordingly, the image processing system 1 of this embodiment automatically creates from the omnidirectional video a two dimensional video that concentrates upon an appropriate photographic subject, and reproduces this two dimensional video, thus solving the problem described above.

The reproduction processing (display processing) performed by the reproduction device 4 for a two dimensional video will now be explained. As described hereinafter, a two dimensional video is built up from a plurality of two dimensional images that are arranged in time series. Each two dimensional image that makes up the two dimensional video is termed a "frame". The control unit 42 reproduces the two dimensional video by displaying this plurality of frames in sequence upon the display unit 40.

It should be understood that input of the omnidirectional video from the imaging device 2 to the image processing device 3 may also be performed by a method that does not employ the storage medium 51. For example, it may be arranged for the imaging device 2 and the image processing device 3 to be electrically connected together by a communication cable, and for the omnidirectional video be inputted to the image processing device 3 by data communication. Alternatively, it may be arranged for the omnidirectional video to be transferred between the imaging device 2 and the image processing device 3 by wireless communication via radio waves. The same is the case for input of the omnidirectional image from the imaging device 2 to the reproduction device 4, and for input of the two dimensional video from the image processing device 3 to the reproduction device 4.

Explanation of Processing to Create a Two Dimensional Video

The processing performed by the image generation unit 30 for creating a two dimensional video will now be explained. The image generation unit 30 creates a two dimensional video from the omnidirectional video by executing two dimensional video creation processing. This two dimensional video creation processing is processing for specifying a main photographic subject from the omnidirectional image, and for creating a two dimensional video that includes this main photographic subject that has thus been specified.

The two dimensional video creation processing includes processing to specify the photographic subject and processing to create a two dimensional image. The photographic subject specification processing is processing to specify a main photographic subject from an omnidirectional image included in the omnidirectional video. And the processing to create a two dimensional image is processing to create a two dimensional image including the main photographic subject as specified by the photographic subject specification processing from the omnidirectional image. The photographic subject specification processing and the processing to create a two dimensional image will be explained in the following in order.

Explanation of the Photographic Subject Specification Processing

The image generation unit 30 specifies a main photographic subject from each frame included in a single omnidirectional video by employing a per se known technique such as facial recognition or pattern matching or the like. For example, if the main photographic subject is a person, then it is possible to detect a face included in the omnidirectional image by employing a technique for recognizing the face of a human being, and to specify the whole body of the person corresponding to the detected face from its orientation, position, color, and so on. It should be understood that "to specify the main photographic subject" means to recognize (i.e. to detect) the positions and the shapes of various photographic subjects that appear in the omnidirectional image, and also to select a main photographic subject from among those photographic subjects. For example, if the main photographic subject is a person and three or more people have been detected from the omnidirectional image, then the image generation unit 30 may specify all of those persons as being the main photographic subject.

Recognition of the main photographic subject may be determined on the basis of various factors (parameters) such as the size, saliency of the photographic subject in the image or the like. Moreover, such recognition may be determined on the basis of movement of the photographic subject or the like by employing a plurality of images that are temporally continuous, instead of employing only one image. It should be understood that, by expressing a parameter numerically and by employing threshold value processing, it is possible to take a photographic subject for which some parameter exceeds a predetermined threshold value as being the main photographic subject. When threshold value processing is employed, a plurality of photographic subjects may be recognized as being the main photographic subject. There may be only one main photographic subject, or a plurality thereof. It should be understood that, since a range of 360° is captured in the omnidirectional image, accordingly the possibility is high that a plurality of photographic subjects will be recognized as being the main photographic subjects, as compared with the case of photography with a normal camera.

Explanation of the Processing to Create a Two Dimensional Video

The processing to create a two dimensional video is processing to create a two dimensional image including the main photographic subject from each frame of the omnidirectional video. The image processing system 1 of this embodiment is configured to automatically create a two dimensional video including a main photographic subject from an omnidirectional video. Each image making up the two dimensional video is termed a "frame". The processing to create a two dimensional video is processing to create two dimensional images (i.e. frames) including the main photographic subject specified by the photographic subject specification processing from the omnidirectional video. In this processing to create two dimensional images, if there is only one main photographic subject, then a frame that includes this one main photographic subject is generated, whereas, if there are two main photographic subjects, then a frame including these two main photographic subjects is generated.

Figure 7:
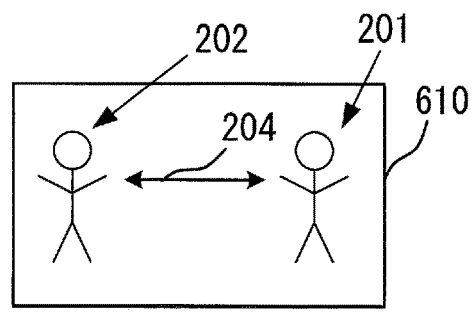
FIG. 7 shows figures showing examples of a two dimensional image.
Figure 7:
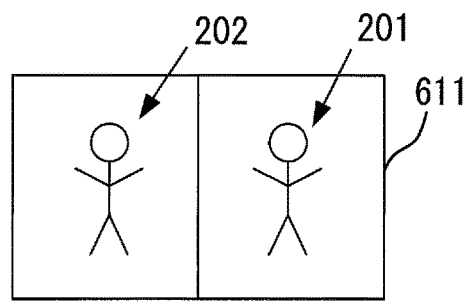
Figure 7:
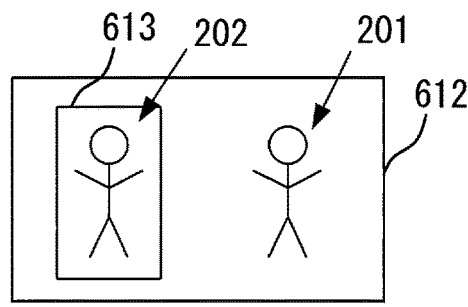
Figure 7:
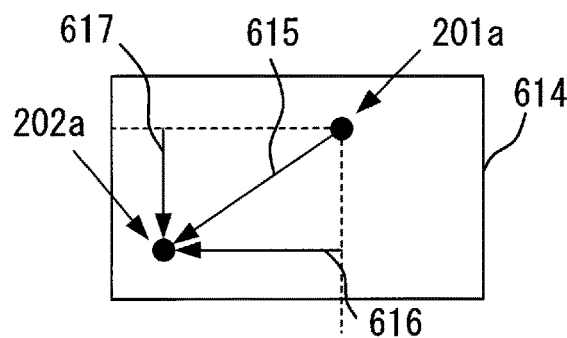

FIGS. 7(*a*) through 7(*c*) are figures showing examples of two dimensional images (i.e. frames) that are generated by the processing to create a two dimensional image when two main photographic subjects have been recognized. A first photographic subject 201 and a second photographic subject 202 are photographic subjects that have been recognized as being main photographic subjects. A two dimensional image 610 shown by way of example in FIG. 7(*a*) is a two dimensional image (i.e. a frame) obtained by cutting out a partial image (i.e. an angle of view) that includes the first photographic subject 201 and the second photographic subject 202 from the omnidirectional image. Furthermore, as shown in FIG. 7(*b*), it would also be acceptable to create a two dimensional image 611 by cutting out the first photographic subject 201 from the omnidirectional image, cutting out the second photographic subject 202 from the omnidirectional image, and sticking these two cutout partial images together in the upward, downward, leftward, or rightward direction. Moreover, as shown in FIG. 7(*c*), it would also be acceptable to create a synthesized two dimensional image 612 by superposing a partial image 613 in which the first photographic subject 201 has been cut out from the omnidirectional image upon an image in which a wide range including the second photographic subject 202 has been cut out from the omnidirectional image.

In the following, a problem with the processing to create a two dimensional image will be explained by employing an example in which a volleyball match is imaged by the imaging device 2.

Figure 6:
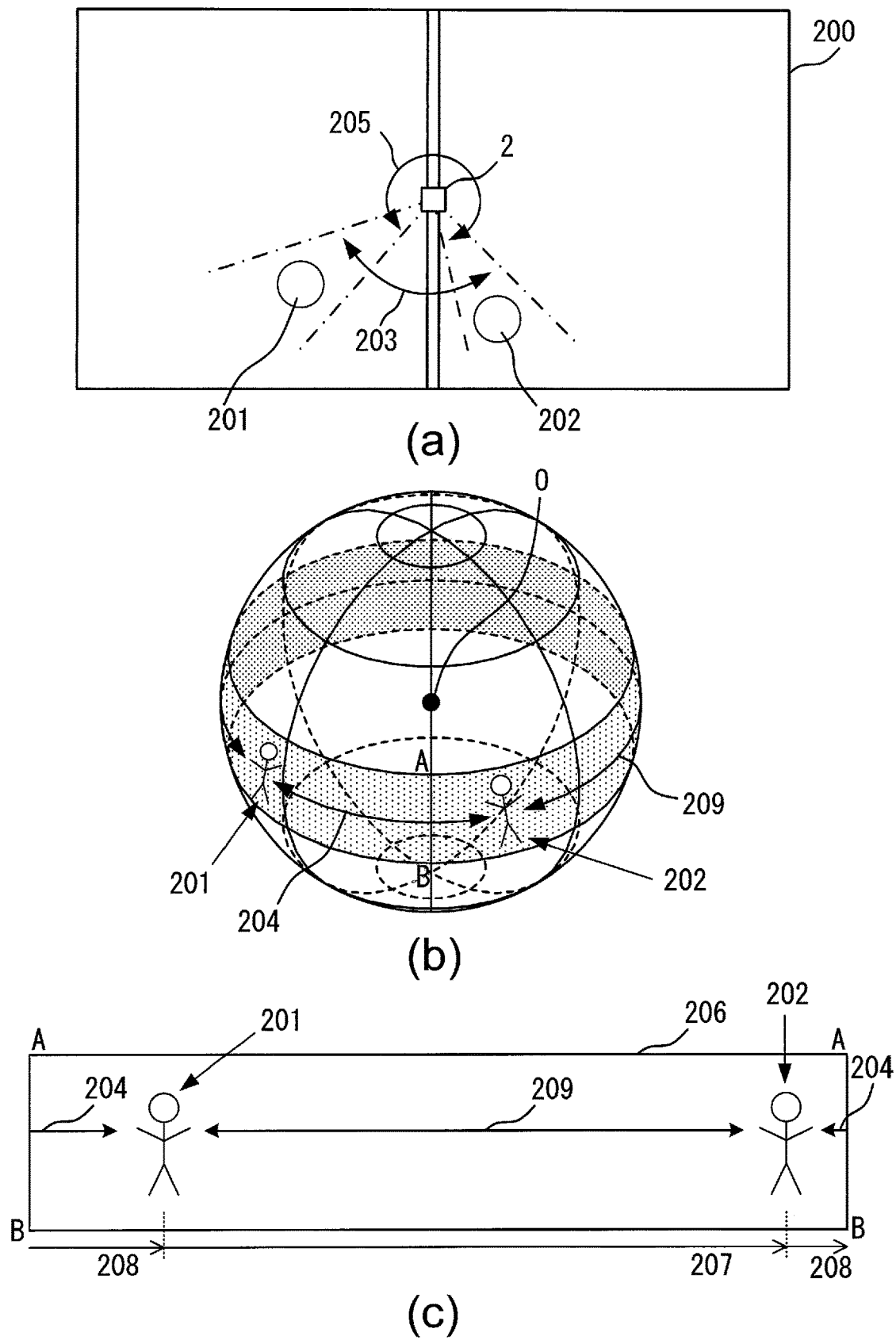
FIG. 6 shows figures for explanation of processing for creation of a two dimensional image.

FIG. 6 shows figures for explanation of the processing to create a two dimensional image. FIG. 6(a) is a plan view of a volleyball court. In the example of FIG. 6, the imaging device 2 is installed in the center of the court 200. A person who is a main photographic subject (hereinafter termed the "first photographic subject 201") is present on the left side of the court 200 in the drawing. And another person who is another main photographic subject (hereinafter termed the "second photographic subject 202") is present on the right side of the court 200 in the drawing. In other words, this is a case in which two main photographic subjects have been recognized. And FIG. 6(b) shows the arrangement of the first photographic subject 201 and the second photographic subject 202 in three dimensional space, centered upon the imaging device 2.

Here, let us consider a case such as in FIG. 7(a) in which a two dimensional image (i.e. a frame) that includes the first photographic subject 201 and the second photographic subject 202 has been cut out from the omnidirectional image. If it is supposed that the image generation unit 30 generates a two dimensional image (i.e. a frame) so as to include the path 204 of FIG. 6(b), then the two dimensional image 610 that is generated has the first photographic subject 201 disposed upon its right side and the second photographic subject 202 disposed upon its left side. On the other hand, if it is supposed that the image generation unit 30 generates a two dimensional image (i.e. a frame) so as to include the path 209 of FIG. 6(b), then the two dimensional image 610 that is generated has the first photographic subject 201 disposed upon its left side and the second photographic subject 202 disposed upon its right side. The problem of arrangement described above also occurs in a similar manner for the two dimensional image 611 and for the two dimensional image 612. In other words, due to the nature of the omnidirectional image, the image generation unit 30 can arrange the first photographic subject 201 and the second photographic subject 202 in at least two ways (i.e. an arrangement with the first photographic subject 201 on the left side and the second photographic subject 202 on the right side, or in an arrangement with the first photographic subject 201 on the right side and the second photographic subject 202 on the left side). It should be understood that, for ease of understanding, the path 204 shown in FIG. 6(b) is illustrated in FIG. 7(a).

Now, when the two dimensional image (or the two dimensional video) generated by the image generation unit 30 is replayed, the visibility for the user differs greatly according to the manner of arrangement. For example, with this example of volleyball, if it is supposed that the first photographic subject 201 is the receiver and the second photographic subject 202 is the attacker, then an image (i.e. a video) that imparts a sense of discomfort results from the arrangement of the first photographic subject 201 and the second photographic subject 202 due to the relationship with the volleyball captured in the two dimensional image 610. Accordingly, it is necessary for the image generation unit 30 to generate a two dimensional image (i.e. a frame) in which the plurality of main photographic subjects (i.e. the two main photographic subjects) are arranged in an appropriate manner.

In processing to create a two dimensional image, the image generation unit 30 of this embodiment creates a two dimensional image that includes both the first photographic subject 201 and the second photographic subject 202 as the main photographic subjects. Using the positions of the first photographic subject 201 and the second photographic subject 202 that have been specified by the photographic subject specification processing, the image generation unit 30 determines the angle of view including the first photographic subject 201 and the second photographic subject 202 as being the angle of view of the two dimensional image. For example, if the first photographic subject 201 and the second photographic subject 202 are present in the positions shown in FIG. 6(a), then the image generation unit 30 determines an angle of view 203 including the first photographic subject 201 and the second photographic subject 202 as being the angle of view of the two dimensional image. And the image generation unit 30 creates a two dimensional image by cutting out contents corresponding to the angle of view 203 from the omnidirectional image, and deforming these contents into a rectangle.

There are a plurality of possible angles of view that include the first photographic subject 201 and the second photographic subject 202. For example, there is an angle of view in which the first photographic subject 201 is disposed on the left of the screen and the second photographic subject 202 is disposed on the right of the screen, and there is also an angle of view in which the first photographic subject 201 is disposed on the right of the screen and the second photographic subject 202 is disposed on the left of the screen. From among a number of angles of view of this sort, the image generation unit 30 selects the angle of view that "includes the shortest path 204 that connects the first photographic subject 201 and the second photographic subject 202 in three dimensional space, and that also includes the first photographic subject 201 and the second photographic subject 202". For example, in FIG. 6(a), as angles of view that include the first photographic subject 201 and the second photographic subject 202, a number of angles of view may be considered, such as the angle of view 203, an angle of view 205 and so on. From among those angles of view, the image generation unit 30 selects the angle of view 203 that includes the shortest path 204 that connects the first photographic subject 201 and the second photographic subject 202, and that also includes both the first photographic subject 201 and the second photographic subject 202. It should be understood that "includes the shortest path 204" also can be considered as meaning "includes a third photographic subject that is present in the shortest path 204 and that is different from the first photographic subject 201 and the second photographic subject 202".

A method for specifying the "shortest path connecting the first photographic subject 201 and the second photographic subject 202 in the omnidirectional image" will now be explained. When the full sphere 60 is sectioned by a plane that passes through the center of the full sphere 60 and also passes through the first photographic subject 201 and through the second photographic subject 202, a part of the circumference of this cross section of the full sphere 60 is the shortest path that connects the first photographic subject 201 and the second photographic subject 202. In the omnidirectional image 206 shown in FIG. 6(b), if the first photographic subject 201 and the second photographic subject 202 are regarded as being points, then the circumference of the cross section of the full sphere 60 may be considered to be constituted by connecting the path 204 and the path 209 together. The shorter one among the path 204 and the path 209 is the shortest path. In other words, the shortest path connecting the first photographic subject 201 and the second photographic subject 202 in the omnidirectional image is the path 204. The shortest path can be specified uniquely, except when the first photographic subject 201 and the second photographic subject 202 are at directly opposite positions upon the full sphere 60.

The image generation unit 30 calculates the shortest path between the first photographic subject 201 and the second photographic subject 202 in the following manner. For example, with the omnidirectional image (i.e. the all-around image) 206 shown in FIG. 6(c), the image generation unit 30 arranges the second photographic subject 202 in the rightward direction from the first photographic subject 201. Alternatively, the image generation unit 30 may prepare an omnidirectional image 206 in which the second photographic subject 202 is arranged in the rightward direction from the first photographic subject 201. As a result, the straight line that connects the first photographic subject 201 and the second photographic subject 202 in the omnidirectional image 206 coincides with the circumference of a cross section of the full sphere 60 when the full sphere 60 is sectioned by a plane that passes through the center of the full sphere 60 and also passes through the first photographic subject 201 and the second photographic subject 202. The image generation unit 30 compares together the path 209 from the second photographic subject 202 to the first photographic subject 201 in the leftward direction, and the shortest path 204 from the first photographic subject 201 to the second photographic subject 202 in the leftward direction. It should be understood that, in this comparison, the image generation unit 30 calculates a distance 208 (hereinafter referred to as the first distance 208) from the first photographic subject 201 to the second photographic subject 202 in the leftward direction. In a similar manner, the image generation unit 30 calculates a distance 207 (hereinafter referred to as the second distance 207) from the second photographic subject 202 to the first photographic subject 201 in the leftward direction. The distance may be calculated by counting the pixels that constitute the omnidirectional image (the all-around image) 206. And the image generation unit 30 compares together the first distance 208 and the second distance 207. In the example of FIG. 6, the second distance 207 is longer than the first distance 208.

Next, a method for generation of a two dimensional image (i.e. a frame) by the image generation unit 30 will be explained. The image generation unit 30 compares together the first distance 208 and the second distance 207 as described above, and determines that the second distance 207 is longer than the first distance 208. Accordingly, the image generation unit 30 generates a two dimensional image (i.e. a frame) in which the first photographic subject 201 is arranged on the right and the second photographic subject 202 is arranged on the left. On the other hand, if the first distance 208 is longer than the second distance 207, then, conversely, the image generation unit 30 generates a two dimensional image (i.e. a frame) in which the first photographic subject 201 is arranged on the left and the second photographic subject 202 is arranged on the right.

Moreover, it would also be possible for the image generation unit 30 to generate a two dimensional image (i.e. a frame) in the following manner. When the image generation unit 30 compares together the first distance 208 and the second distance 207, if it has been determined that the second distance 207 is longer than the first distance 208, then the angle of view is determined so as to include the shortest path 204, and moreover so as to include the first photographic subject 201 and the second photographic subject 202. And, when a partial image is cut out from the omnidirectional image (i.e. the all-around image) 206 with the angle of view that has thus been determined, the first photographic subject 201 is arranged on the right side of the second photographic subject 202 in the partial image. Accordingly, the image generation unit 30 generates a two dimensional image (i.e. a frame) so that the first photographic subject 201 is arranged on the right and the second photographic subject 202 is arranged on the left.

It should be understood that the first distance 207 described above corresponds to a distance by which the image displayed upon the display unit 40 shifts when the user repeats the scrolling operation in the leftward direction, after the first photographic subject 201 has been displayed upon the display unit 40 until the second photographic subject 202 is displayed upon the display unit 40, in the reproduction processing for the omnidirectional image by the reproduction device 4 described above. And the second distance 208 described above corresponds to a distance by which the image displayed upon the display unit 40 shifts when the user repeats the scrolling operation in the leftward direction, after the second photographic subject 202 has been displayed upon the display unit 40 until the first photographic subject 201 is displayed upon the display unit 40, in the reproduction processing for the omnidirectional image by the reproduction device 4 described above.

As described above, the image generation unit 30 generates, from the omnidirectional image, a two dimensional image in which the first photographic subject 201 and the second photographic subject 202 are arranged, on the basis of the first distance 207 by which the image displayed upon the display unit 40 shifts from when the first photographic subject 201 is displayed upon the display unit 40 until the second photographic subject 202 is displayed upon the display unit 40, and on the basis of the second distance 208 by which the image displayed upon the display unit 40 shifts from when the second photographic subject 202 is displayed upon the display unit 40 until the first photographic subject 201 is displayed upon the display unit 40. In concrete terms, if the first distance 207 is longer than the second distance 208, then the image generation unit 30 generates a two dimensional image from the omnidirectional image which includes the first photographic subject 201 and the second photographic subject 202, and in which the second photographic subject 202 is disposed on the left side of the first photographic subject 201.

What direction the left side (i.e. the first direction side) of the first photographic subject 201 indicates will now be described in detail by using FIG. 7(d). It should be understood that, in FIG. 7(d), the position 201a of the first photographic subject 201 and the position 202a of the second photographic subject 202 are represented by dots for the sake of simplicity of explanation. When the position 201a of the first photographic subject 201 and the position 202a of the second photographic subject 202 are known, it is possible to obtain a vector 615 having the first photographic subject 201 as start point and the second photographic subject 202 as end point. This vector 615 may be decomposed into a component 616 in the leftward direction (i.e. in the horizontal direction) and a component 617 in the direction orthogonal to the leftward direction (i.e. in the vertical direction). If the component 616 in the leftward direction is positive in terms of the leftward direction, then the second photographic subject 202 is positioned on the left side of the first photographic subject 201. In other words, "the second photographic subject 202 is disposed on the left side (i.e. on the first direction side) of the first photographic subject 201" means that, the vector 615 whose start point is the position 201a of the first photographic subject 201 and whose end point is the position 202a of the second photographic subject 202 has a positive component in the leftward direction (i.e. in the first direction). It should be noted that it does not matter what the state of the component 617 of this vector 615 in the direction (i.e. the vertical direction) orthogonal to the leftward direction (i.e. the first direction) is.

It should be noted that, for generating the two dimensional image (i.e. the frame) with the image generation unit 30, while an idea of using the first distance 207 and the second distance 208 has been explained with reference to FIG. 6, another method can also be explained by employing, not distances, but rather angles in three dimensional space. For example, in FIG. 6(b), consider the angle formed by a vector from the origin O toward the first photographic subject 201, and a vector from the origin O toward the second subject 202. There are two angles formed by these vectors to be considered: an acute angle and an obtuse angle. Among these, the acute angle corresponds to the shortest path 204 and to the angle of view 203, while the obtuse angle corresponds to the path 209 and to the angle of view 205. Accordingly, the image generation unit 30 determines the angle of view so that the angle formed by these two vectors becomes minimum, and moreover so as to include the first photographic subject 201 and the second photographic subject 202. When a partial image is cut out from the omnidirectional image (i.e. the all-around image) 206 with the angle of view that has thus been determined, the first photographic subject 201 is arranged on the right side of the second photographic subject 202 in the partial image. Accordingly, the image generation unit 30 generates a two dimensional image (i.e. a frame) so that the first photographic subject 201 is arranged on the right and the second photographic subject 202 is arranged on the left.

The image generation unit 30 generates (i.e., creates) two dimensional images (i.e., frames) by the processing explained above. And the image generation unit 30 generates (i.e. creates) a two dimensional video that includes those two dimensional images, and stores it upon the storage medium 52.

Figure 8:
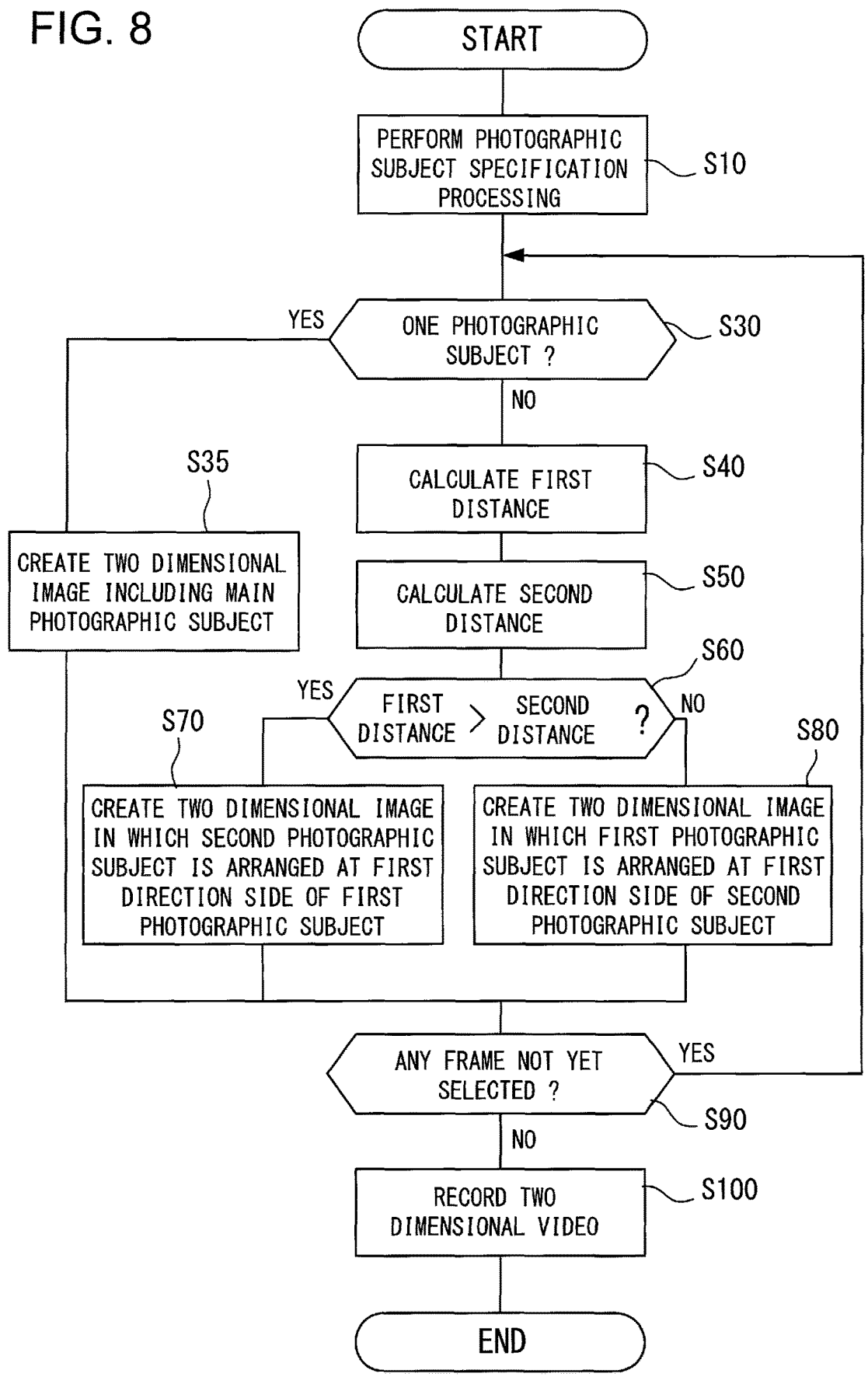
FIG. 8 is a flow chart for processing for creation of a two dimensional video.

FIG. 8 is a flow chart for the two dimensional video creation processing. First in step S10 the image generation unit 30 performs the photographic subject specification processing upon each frame included in the omnidirectional video. Due to this, the main photographic subject for each frame is specified.

Then in step S30 the image generation unit 30 selects one frame included in the omnidirectional video. And the image generation unit 30 acquires the number of main photographic subjects that are specified in this selected frame. If there is only a single main photographic subject (YES in step S30), then the flow of control is transferred to step S35. In step S35, on the basis of the omnidirectional image (i.e., frame), the image generation unit 30 creates a two dimensional image (i.e. a frame) that includes the main photographic subject.

But if there are two or more main photographic subjects (NO in step S30), then the flow of control proceeds to step S40. In step S40, the image generation unit 30 calculates the first distance in the selected frame. In other words, the image generation unit 30 takes one of the two main photographic subjects as being the first photographic subject and the other as being the second photographic subject, and calculates the distance from the first photographic subject along a first direction until arriving at the second photographic subject. Then in step S50 the image generation unit 30 calculates the second distance in the selected frame. In other words, the image generation unit 30 calculates the distance from the second photographic subject along the first direction until arriving at the first photographic subject. It should be understood that by the first direction is meant a direction in which, when a part of a frame included in the omnidirectional video is being displayed upon the display unit 40, and when the user repeats the scrolling operation in some direction, after the first photographic subject 201 has been displayed upon the display unit 40, the first photographic subject 201 disappears from the display unit 40, and thereafter the second photographic subject 202 is displayed, and then the first photographic subject 201 is again displayed upon the display unit 40 for a second time.

In step S60, the image generation unit 30 determines whether or not the first distance calculated in step S40 is longer than the second distance calculated in step S50. If the first distance is longer than the second distance, then the image generation unit 30 transfers the flow of control to step S70. In step S70, on the basis of the omnidirectional image (i.e. the frame) selected in step S30, the image generation unit 30 creates a two dimensional image in which the second photographic subject is arranged towards the first direction from the first photographic subject. On the other hand, if the first distance is less than or equal to the second distance, then the image generation unit 30 transfers the flow of control to step S80. In step S80, on the basis of the frame selected in step S30, the image generation unit 30 creates a two dimensional image in which the first photographic subject is arranged towards the first direction from the second photographic subject.

Then in step S90 the image generation unit 30 determines whether or not any frame that has not yet been selected remains in the omnidirectional video. If some frame remains that has not yet been selected, then the image generation unit 30 transfers the flow of control to step S30. On the other hand, if all of the frames have already been selected, then the image generation unit 30 transfers the flow of control to step S100. In step S100, the image generation unit 30 controls the output unit 32 so as to store the two dimensional video made up from the two dimensional images that have been created in steps S70 and S80 upon the storage medium 52.

According to the embodiment described above, the following advantageous operational effect is obtained.

(1) According to the structure of this embodiment, it is possible automatically to create a two dimensional image that is suitable for viewing from the omnidirectional image.

Variant of First Embodiment

It should be understood that a single device may incorporate two or more among the imaging unit 20, the image generation unit 30, and the display unit 40. For example, the imaging device 2 may incorporate the image generation unit 30 in addition to the imaging unit 20. In this case, the imaging device 2 would also fulfil the role of the image processing device 3. Accordingly, the image processing device 3 may not be included in the image processing system 1. And, as another example, the image processing device 3 may incorporate the display unit 40 in addition to the image generation unit 30. In this case, the image processing device 3 would also fulfil the role of the reproduction device 4. Accordingly, the reproduction device 4 may not be included in the image processing system 1. As another example, in addition to the imaging unit 20, the imaging device 2 may also include the image generation unit 30 and the display unit 40. In this case, the imaging device 2 would also fulfil the roles of the image processing device 3 and the reproduction device 4. In other words, the imaging device 2 would, by itself, provide functions equivalent to those of the image processing system 1.

Figure 10:
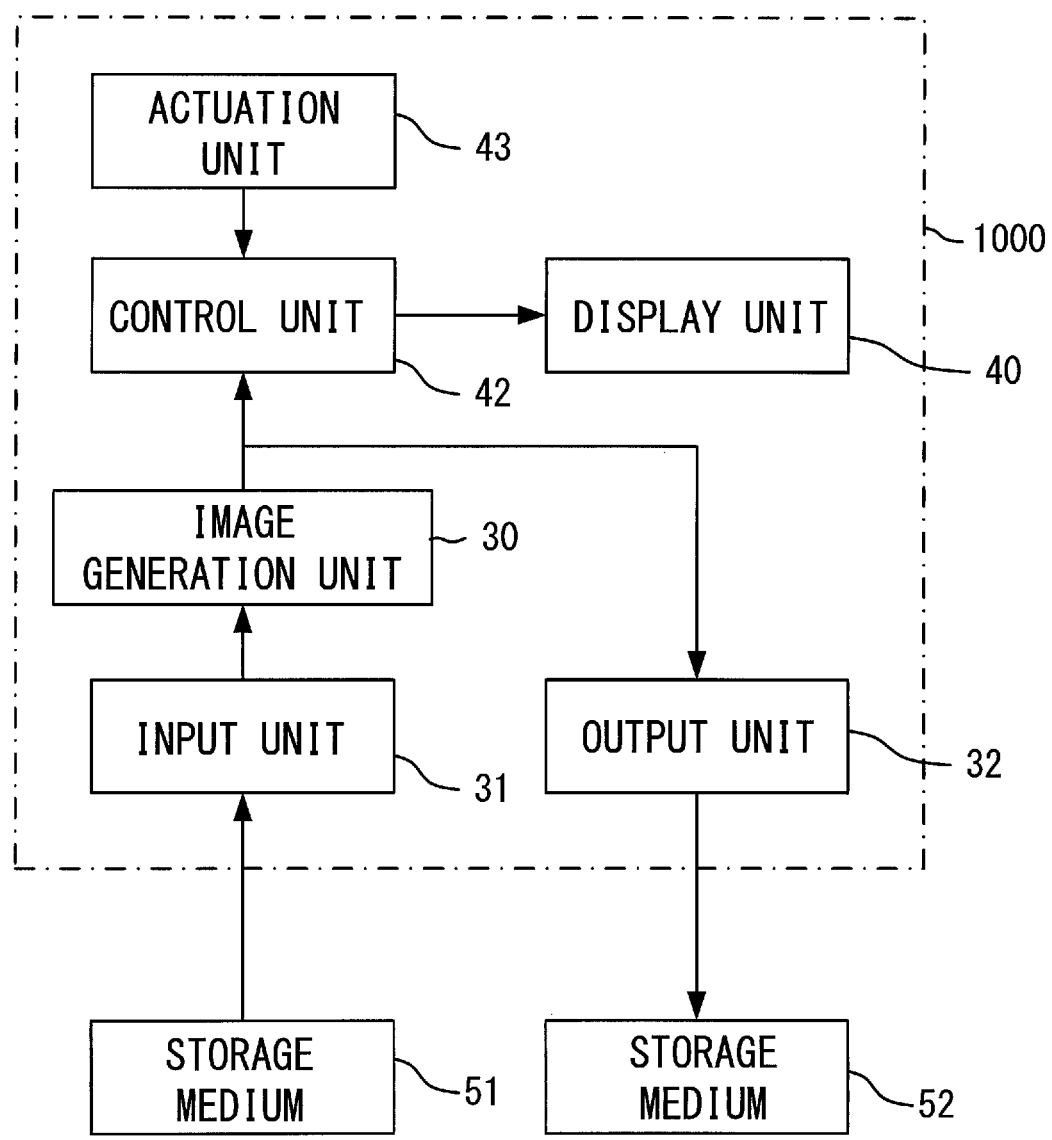
FIG. 10 is a block diagram schematically showing an electronic device that serves both as an image processing device and a reproduction device.

FIG. 10 is a block diagram schematically showing an electronic device 1000 that combines the image processing device 3 and the reproduction device 4. This electronic device 1000 may be, for example, a smart phone or a tablet terminal. The electronic device 1000 comprises an image generation unit 30, an input unit 31, an output unit 32, a display unit 40, a control unit 42, and an actuation unit 43. The electronic device 1000 is capable of creating a two dimensional video, reproducing upon the display unit 40 a two dimensional video that has been created, storing upon the storage medium 52 a two dimensional video that has been created, and performing reproduction of an omnidirectional image (i.e. an omnidirectional video) upon the display unit 40. It should be understood that the operation of each of these sections of the electronic device 1000 is the same as in the case of the first embodiment, and accordingly explanation thereof will be omitted.

According to the variant embodiment described above, the following advantageous operational effect is obtained.

(2) According to the structure of this embodiment, a similar advantageous effect to that of the embodiment described above can be obtained.

It should be understood that the creation of a two dimensional video by the image generation unit 30 could be performed in real time in parallel with the creation of an omnidirectional video by the imaging unit 20, or could be started after the creation of the omnidirectional video has been completed. In a similar manner, the display of the two dimensional video by the display unit 40 may be performed in real time in parallel with the creation of a two dimensional video by the image generation unit 30, or could be started after the creation of the two dimensional video has been completed.

In the embodiment described above, it was explained that the imaging unit 20 captures an image of a full sphere. In other words, although it has been explained that the imaging unit 20 is capable of capturing an image over a full range of 360° around itself, it would also be possible for the imaging unit 20 only to be capable of capturing an image over a narrower range than a full sphere, in the vertical direction and/or in the horizontal direction. For example, the imaging unit 20 may be adapted to capture an image over a hemisphere. Alternatively, the imaging unit 20 may only be capable of capturing an image over a range that is yet more restricted than a hemisphere. For example, the imaging unit may only be capable of capturing an image over the range 68 shown by stippling in FIG. 3(a). If the angle of view of the imaging unit 20 is more restricted than a full sphere, then the two dimensional video will be composed of images whose angles of view are yet more restricted.

Furthermore, the all-around image may not necessarily be an image that is captured over the entire range of 360°. For example, it would also be possible to treat an image that has been captured over a range of around 300° as an all-around image in which the left and right ends are connected together. The same is the case for an omnidirectional image; it would also be possible to treat an image of which a portion of the complete sphere is missing as being an omnidirectional image which is made continuous everywhere.

In this specification, the omnidirectional image is an image in which, by repeating control in which a part of an image that is displayed upon the display unit 40 is shifted in the first direction so that a portion of the image that is not displayed upon the display unit 40 is displayed, after the first photographic subject 201 which is included in that image is displayed, the second photographic subject 202 is displayed, and then the first photographic subject 201 is again displayed upon the display unit 40 for a second time. Moreover, an image with a part of the full sphere missing is also an omnidirectional image since, by making the missing portion continuous by connecting over it and by repeating control to shift the part of the image displayed upon the display unit 40 in the first direction and to display the part of the image that is not displayed upon the display unit 40, after the first photographic subject 201 that is included in that image is displayed, the second photographic subject 202 is displayed, and then the first photographic subject 201 is again displayed upon the display unit 40 for a second time.

FIG. 9(a) is a schematic figure showing an example of an omnidirectional image. An image 620 and an image 621 that correspond to hemispheres are images that have been obtained by capturing over smaller ranges than 360°, so that portions of the hemispheres are missing. The image generation unit 30 and the control unit 42 are able to handle these images by treating the side E-F and the side G-F as being mutually continuous. In other words, the images shown in FIG. 9(a) are omnidirectional images.

FIG. 9(b) is a schematic figure showing an example of an all-around image. In FIG. 9(b), an image 622, an image 623, and an image 624 that have been captured by imaging over discontinuous ranges in the horizontal direction are illustrated. These three images are images that have been captured over ranges that are smaller than 360° in the horizontal direction, so that a portion of the full 360° extent is missing. The image generation unit 30 and the control unit 42 are able to treat the sides A-B, the sides C-D, and the sides E-F as though they are continuous. In concrete terms, in the state in which a portion of the image 622 is being displayed upon the display unit 40, the control unit 42 repeatedly performs control to cause the image 622 to be shifted in the horizontal leftward direction, so that another portion of the image 622 that is not displayed upon the display unit 40 is now caused to be displayed. As a result, the sides C-D are displayed, and subsequently the sides E-F are displayed. And, by further repeating this control, the sides A-B are displayed, and the system returns to the state in which the portion of the image 622 is displayed upon the display unit 40. Accordingly, the image 622, the image 623, and the image 624 shown in FIG. 9(b) constitute an all-around image. This is because the image shown in FIG. 9(b) (i.e. the image 622, the image 623, and the image 624) is an image in which, by taking appropriate photographic subjects included in that image as being the first photographic subject 201 and the second photographic subject 202, and by repeatedly performing control so as to cause a part of the image displayed upon the display unit 40 to be shifted in the first direction and another portion of the image that is not being displayed upon the display unit 40 now to be displayed, after the first photographic subject 201 included in that image has been displayed, the second photographic subject is displayed, and then again the first photographic subject 201 is displayed for a second time. It should be understood that here, by an "all-around image" (or a "full sphere image"), is meant an image in which the continuity of the image contents is of no importance. In other words, for example, when the image that includes the sides C-D is displayed upon the display unit 40, the user may visually confirm that the image contents on the left of the side C-D and the image contents on the right of the side C-D are mutually discontinuous. However, continuity of the image contents does not matter, but continuity of the images is important. In other words, it will suffice if the image on the left of the side C-D and the image on the right of the side C-D are continuous with one another.

For example, first considering the image 622, this image 622 may be termed an all-around image, by treating the side A-B and the side C-D as continuous. Moreover, considering the image 623, this image 623 may be termed an all-around image, by treating the side C-D and the side E-F as continuous. All of the images are omnidirectional images (all-around images), since they are images for which, by treating all of them in a similar manner, and by repeating control to cause a portion of the image displayed upon the display unit 40 to shift in the first direction so that another portion of the image that is not displayed upon the display unit 40 is now displayed, after the first photographic subject 201 included in that image is displayed the second photographic subject 202 is displayed, and then the first photographic subject 201 is again displayed upon the display unit 40 for a second time.

Figure 9:
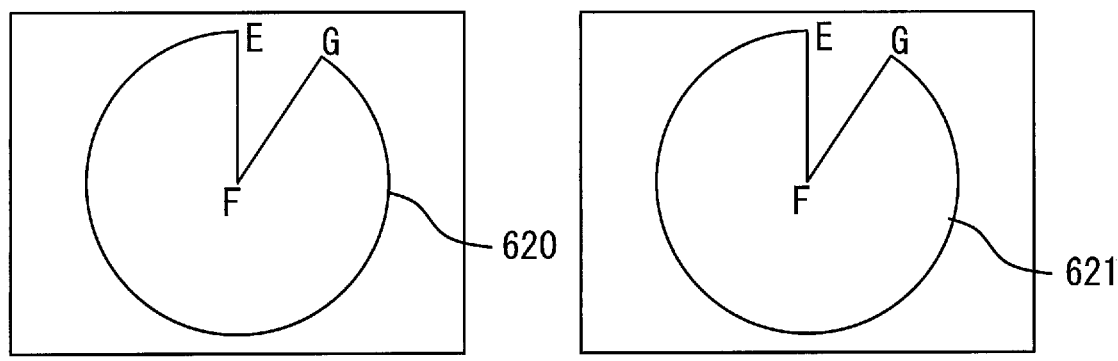
FIG. 9 shows schematic figures showing a variant embodiment of an omnidirectional image.
Figure 9:
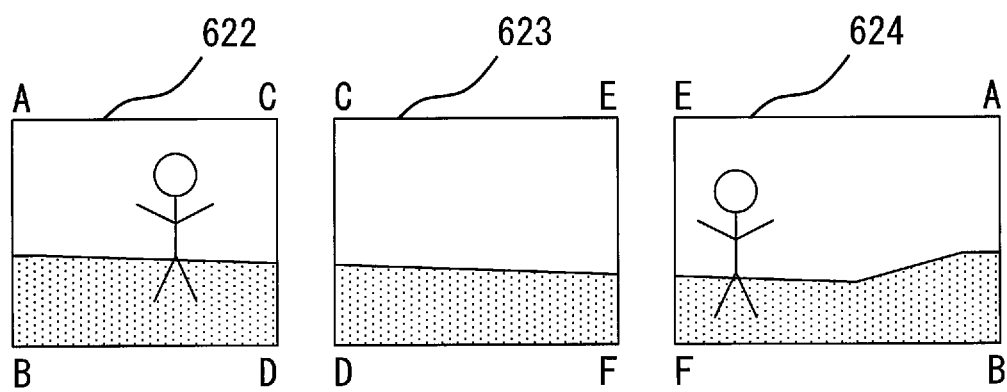

It should be understood that, as shown in FIG. 9(*b*), the processing performed by the image generation unit 30 for generation of a two dimensional image is in no way different from the embodiment described above, even for the all-around image and the omnidirectional image (i.e., the image 622, the image 623, and the image 624) which are not actually mutually continuous. In other words, how to generate a two dimensional image (i.e. a frame) in which the first photographic subject 201 and the second photographic subject 202 are arranged from the all-around image (the image 622, the image 623, and the image 624) may be determined in a similar manner to the case with the embodiment described above. For example, the distance through which the image displayed upon the display unit 40 is shifted by repeatedly performing operation to scroll the screen in the leftward direction from when the first photographic subject 201 is displayed upon the display unit 40 until the second photographic subject 202 is displayed upon the display unit 40, and the distance through which the image displayed upon the display unit 40 is shifted by repeatedly performing operation to scroll the screen in the leftward direction from when the second photographic subject 202 is displayed upon the display unit 40 until the first photographic subject 201 is displayed upon the display unit 40, may be compared together, and, if the former distance is longer than the latter distance, then a two dimensional image may be created so that the second photographic subject 202 is arranged in the leftward direction from the first photographic subject 201.

According to the variant embodiment described above, the following advantageous operational effect is obtained.

(3) According to the structure of this embodiment, it is possible automatically to generate a two dimensional image that is suitable for viewing from the all-around image.

It should be understood that it would also be possible to create the two dimensional image (i.e. the frame) that includes the first photographic subject 201 and the second photographic subject 202 by some method other than that described above with reference to FIG. 7(*a*) through FIG. 7(*c*). For example, a two dimensional image in which the space between the first photographic subject 201 and the second photographic subject 202 is compressed may be created by employing a technique such as seam carving or the like. Alternatively, it would also be possible to create a two dimensional image by decimating or shrinking a photographic subject present between the first photographic subject 201 and the second photographic subject 202.

It would also be possible to arrange for the image generation unit 30 not to perform the photographic subject specification processing for all of the frames, but rather for only some of the frames. For example, the image generation unit 30 may specify the main photographic subject for every 30th frame, i.e. for the first frame, the 31st frame, the 61st frame, and so on. Thus, the image generation unit 30 does not execute the photographic subject specification processing for the 29 frames between the first frame and the 31st frame.

For example, if the frame rate of the omnidirectional video is 60 fps, then 30 frames corresponds to 0.5 seconds. During a period of around 0.5 seconds, it may be expected that the position of the main photographic subject hardly changes. In other words, the position of the main photographic subject in the above described 29 frames can be easily estimated from the position of the main photographic subject in the first frame and the position of the main photographic subject in the 31st frame.

In this manner, by executing the photographic subject specification processing only for some of the omnidirectional images (i.e. by specifying the main photographic subject from only some of the omnidirectional images), it is possible to reduce the amount of calculation required for performing the two dimensional video creation processing.

Second Embodiment

In an image processing system according to the second embodiment, the details of the two dimensional video creation processing performed by the image generation unit 30 are different from the case of the first embodiment. It should be understood that features that are not mentioned in connection with this second embodiment are the same as the details explained in connection with the first embodiment. In other words, the details explained in connection with the first embodiment are all to be considered as being incorporated in this second embodiment. In the following, the image processing system according to the second embodiment will be explained with emphasis centering upon the features of difference from the image processing system of the first embodiment.

In a similar manner to the case with the first embodiment, the image generation unit 30 performs the photographic subject specification processing for each frame. The image generation unit 30 performs orientation specification processing for the main photographic subject that has been specified, in which the orientation of the main photographic subject within the frame is specified. In this embodiment the main photographic subject is a person, and by the orientation of the main photographic subject is meant the orientation of the face of the person within the image. In the orientation specification processing, the image generation unit 30 performs per se known facial recognition processing, and thereby recognizes the face of the main photographic subject and the orientation of that face. And the image generation unit 30 specifies the orientation of the face of the main photographic subject within the image as being the orientation of this main photographic subject.

Next, a method for specifying the orientation of the main photographic subject in the image will be explained. First, the orientation of the main photographic subject in three dimensional space is determined. For example, if the main photographic subject is a human being, then the direction in which his or her nose is pointing is taken as being his or her orientation. In this case, the orientation of the vector whose start point is the center of his or her face and whose end point is the apex of his or her nose may be taken as being the orientation of the main photographic subject. The method for determining the orientation of the main photographic subject in three dimensional space will be described hereinafter. When a vector giving the orientation of the main photographic subject in three dimensional space is specified, that vector is projected onto the image (or onto the imaging surface). As a result, the vector projected onto the two dimensional image in which the main photographic subject is imaged (i.e. the projected vector) becomes the orientation of the main photographic subject in the image.

Figure 11:
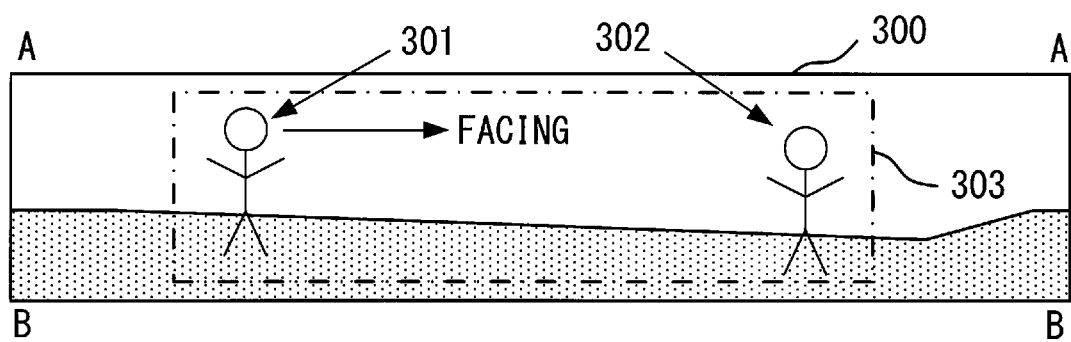
FIG. 11 is a figure for explanation of processing for creation of a two dimensional image.

FIG. 11 is a figure for explanation of the processing to create a two dimensional image. The omnidirectional image 300 shown in FIG. 11 includes a first photographic subject 301 and a second photographic subject 302, which are the main photographic subjects. The distance, due to control to shift the portion of the omnidirectional image 300 displayed upon the display unit 400 in the leftward direction, by which the image displayed upon the display unit 40 is shifted from the first photographic subject being displayed upon the display unit 40 until the second photographic subject is displayed upon the display unit 40 (i.e. the distance in the rightward direction from the first photographic subject 301 to the second photographic subject 302) is longer than the distance from the second photographic subject 302 in the rightward direction to the first photographic subject 301. Accordingly, if it is supposed that a two dimensional image is created by performing processing similar to that of the first embodiment, then a two dimensional image is created in which the second photographic subject 302 is arranged on the left side of the first photographic subject 301.

As described above, the nature of the omnidirectional image is such that the image generation unit 30 is capable of arranging the first photographic subject 201 and the second photographic subject 202 in at least two ways (i.e., with the first photographic subject 201 on the left side and the second photographic subject 202 on the right side, or with the first photographic subject 201 on the right side and the second photographic subject 202 on the left side). On the other hand, when a two dimensional image (or a two dimensional video) generated by the image generation unit 30 is reproduced, the viewability for the user is very different, depending upon the arrangement. Thus, it is necessary for the image generation unit 30 to generate a two dimensional image (or a frame) in which the plurality of main photographic subjects (i.e. the two photographic subjects) are arranged in an appropriate manner.

The image processing unit 30 of this embodiment creates a two dimensional image in which the first photographic subject 301 faces toward the second photographic subject 302 in the image. In the image shown by way of example in FIG. 11, the first photographic subject 301 is facing in the rightward direction in the drawing. Thus, by creating a two dimensional image (i.e. a frame) in which the first photographic subject 301 and the second photographic subject 302 are arranged so that the first photographic subject 301 is facing toward the second photographic subject 302, it is possible to create an image (a picture) in which no sense of discomfort is imparted to the user. Accordingly the image processing unit 30 creates a two dimensional image in which the first photographic subject 301 is arranged on the left side of the second photographic subject 302.

Next, the feature that the first photographic subject 301 is facing toward the second photographic subject 302 in the image will be explained. As described above, when a vector that describes the orientation of the main photographic subject in three dimensional space is projected upon the image (or upon the imaging surface), the projected vector is the orientation of the main photographic subject in the image. For example, the vector shown in FIG. 11 is the projected vector for the first photographic subject 301. In the image 300, the first photographic subject 301 is taken as being the origin, and the direction from the first photographic subject 301 toward the second photographic subject 302 is taken as being the X axis. At this time, if the component of the projected vector of the first photographic subject 301 in the X axis direction is positive, then it can be determined that the first photographic subject 301 is facing the second photographic subject 302. Conversely, if the component of the projected vector of the first photographic subject 301 in the X axis direction is negative, then it can be determined that the first photographic subject 301 is not facing the second photographic subject 302.

The image generation unit 30 generates from the omnidirectional image a two dimensional image that includes the first photographic subject 301 and the second photographic subject 302 and in which the first photographic subject 301 is arranged on the first direction side of the second photographic subject 302, if the first distance by which the image displayed upon the display unit 40 is shifted from when the first photographic subject 301 is displayed upon the display unit 40 until the second photographic subject 302 is displayed upon the display unit 40 is longer than the second distance by which the image displayed upon the display unit 40 is shifted from when the second photographic subject 302 is displayed upon the display unit 40 until the first photographic subject 301 is displayed upon the display unit 40, and if, in the image displayed upon the display unit 40 from when the second photographic subject 302 is displayed upon the display unit 40 until the first photographic subject 301 is displayed upon the display unit 40, the first photographic subject 301 is not facing toward the second photographic subject 302.

Next, the method for determining the orientation of the photographic subject in three dimensional space will be explained. While the orientation of the nose of a person has been explained as an example, the orientation of the face of the photographic subject (i.e. the person) could also be employed. It would be acceptable for the direction in which the eyes are facing to be taken as being the orientation of the face, or, if the face is modeled as a plane, it may be taken as being the direction normal to that plane. Alternatively, not the orientation of the face of the person, but rather the orientation of the body of the person may be employed as the orientation of the photographic subject. If the orientation of the body is employed, then the chest may be modeled as a plane, and the direction normal to that plane may be taken as being the orientation of the body. In any of these cases, by stipulating the orientation of the photographic subject in three dimensional space in advance, it is possible uniquely to determine the orientation of the photographic subject in three dimensional space. Moreover, if a photographic subject other than a person is employed as the main photographic subject, then an orientation that is appropriate for that photographic subject may be stipulated. For example, if the main photographic subject is a vehicle or some other moving object, then the direction of traveling (i.e. the direction of movement) of that vehicle may be taken as being the orientation of the main photographic subject. Moreover, if the main photographic subject is a building, then the orientation of the main entrance at the front of that building may be taken as being the orientation of the main photographic subject.

Next, the way in which the orientation of the photographic subject in three dimensional space is acquired will be explained. Since, as described above, the orientation is stipulated in dependence upon the photographic subject, accordingly, for example, the image generation unit 30 is able to acquire the orientation of the main photographic subject in three dimensional space by image analysis of the omnidirectional image, or from the output of a sensor provided separately from the imaging unit 20, or by distance measurement calculation employing the imaging unit 20. If it is possible to acquire a vector that indicates the orientation of the main photographic subject in three dimensional space, then the projected vector can be acquired by projecting that vector. And the image generation unit 30 is able to calculate the orientation of the main photographic subject in the image on the basis of the projected vector, as described above.

According to the embodiment described above, the following advantageous operational effect is obtained.

(1) According to the structure of this embodiment, it is possible automatically to generate a two dimensional image that is suitable for viewing from the omnidirectional image.

Variant of Second Embodiment

It should be understood that a single device may incorporate two or more of the imaging unit 20, the image generation unit 30, and the display unit 40. For example, the imaging device 2 may incorporate the image generation unit 30 in addition to the imaging unit 20. In this case, the imaging device 2 would also fulfil the role of the image processing device 3. Accordingly, the image processing device 3 may not be included in the image processing system 1. And, as another example, the image processing device 3 may incorporate the display unit 40 in addition to the image generation unit 30. In this case, the image processing device 3 would also fulfil the role of the reproduction device 4. Accordingly, the reproduction device 4 may not be included in the image processing system 1. As another example, in addition to the imaging unit 20, the imaging device 2 may also include the image generation unit 30 and the display unit 40. In this case, the imaging device 2 would also combine the roles of the image processing device 3 and the reproduction device 4. In other words, the imaging device 2 would, by itself, provide functions equivalent to those of the image processing system 1.

FIG. 10 is a block diagram schematically showing an electronic device 1000 that serves as both the image processing device 3 and the reproduction device 4. This electronic device 1000 may be, for example, a smart phone or a tablet terminal. The electronic device 1000 comprises an image generation unit 30, an input unit 31, an output unit 32, a display unit 40, a control unit 42, and an actuation unit 43. The electronic device 1000 is capable of creating a two dimensional video, reproducing upon the display unit 40 a two dimensional video that has been created, storing upon the storage medium 52 a two dimensional video that has been created, and performing reproduction of an omnidirectional image upon the display unit 40. It should be understood that the operation of each of these sections of the electronic device 1000 is the same as in the case of the first embodiment, and accordingly explanation thereof will be omitted.

According to the variant embodiment described above, the following advantageous operational effect is obtained.

(2) According to the structure of this embodiment, it is possible to obtain advantageous operational effects similar to those of the embodiment described above.

It should be understood that the creation of a two dimensional video by the image generation unit 30 may be performed in real time in parallel with the creation of the omnidirectional video by the imaging unit 20, or may be started after the creation of the omnidirectional video has been completed. In a similar manner, the display of the two dimensional video upon the display unit 40 may be performed in real time in parallel with the creation of the two dimensional video by the image generation unit 30, or may be started after the creation of the two dimensional video has been completed.

According to the variant embodiment described above, the following advantageous operational effect is obtained.

(3) According to the structure of this embodiment, it is possible automatically to generate a two dimensional image that is suitable for viewing from the all-around image.

Third Embodiment

In an image processing system according to the third embodiment, the details of the two dimensional video creation processing performed by the image generation unit 30 are different from the case of the first embodiment. It should be understood that features that are not mentioned in connection with this embodiment are the same as the details explained in connection with the first embodiment. In other words, the details explained in connection with the first embodiment are all to be considered as being incorporated in this third embodiment. In the following, the image processing system according to the third embodiment will be explained with emphasis centering upon the features of difference from the image processing system of the first embodiment. The image generation unit 30 of this third embodiment performs the photographic subject specification processing in a similar manner to the case in the first embodiment. Since the details thereof are the same as in the first embodiment, accordingly explanation will be omitted.

Figure 12:
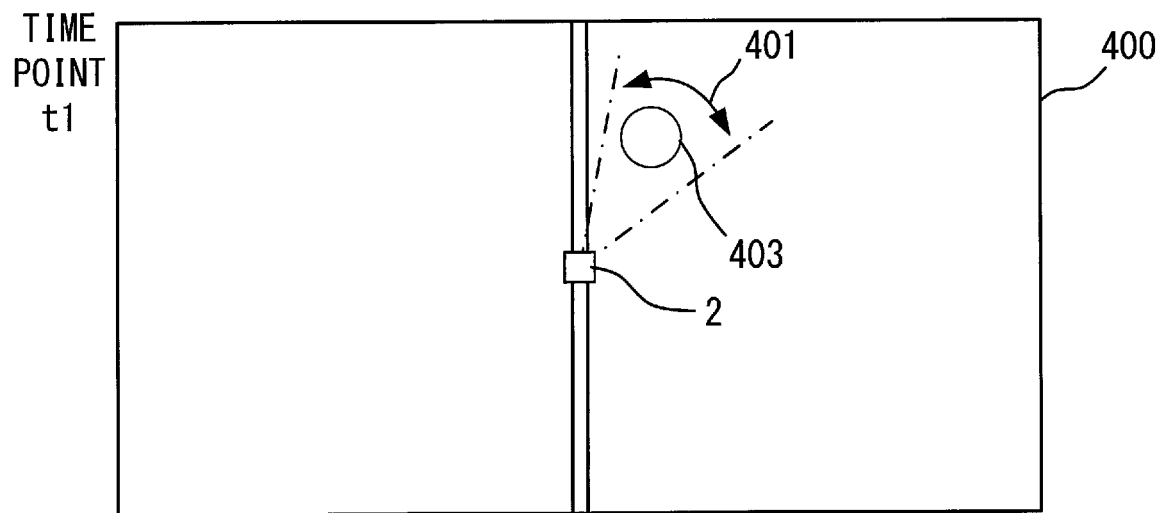
FIG. 12 shows figures for explanation of processing for creation of a two dimensional image.
Figure 12:
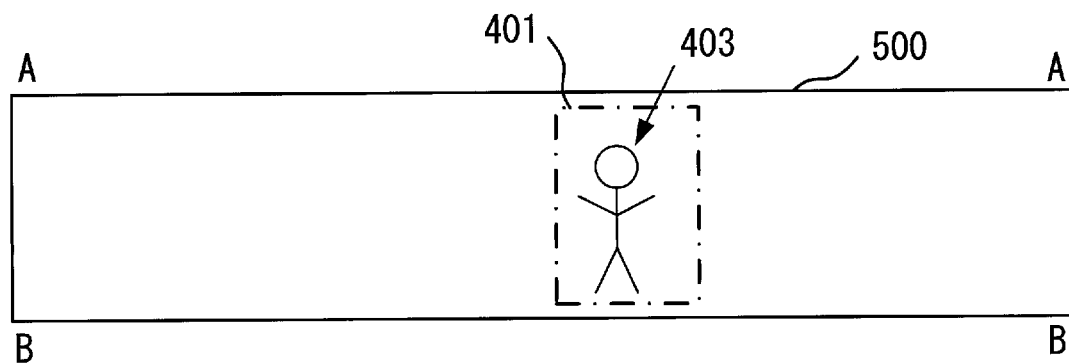
Figure 13:
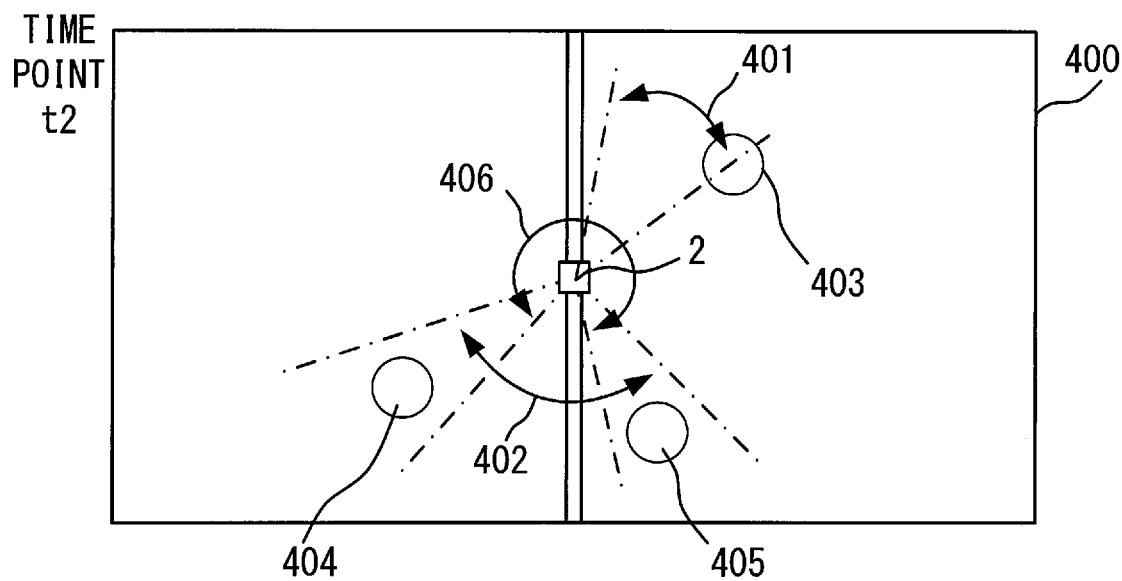
FIG. 13 shows figures for explanation of processing for creation of a two dimensional image.
Figure 13:
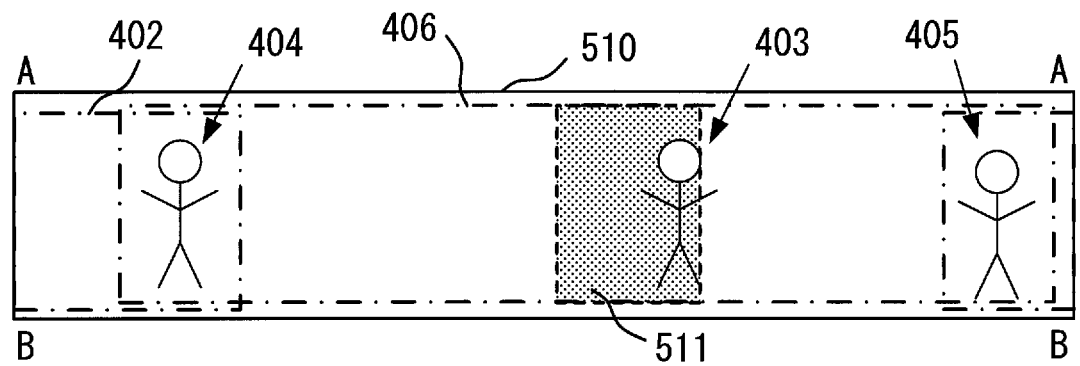

FIG. 12 and FIG. 13 are figures for explanation of the processing for creation of a two dimensional image. FIG. 12(*a*) and FIG. 13(*a*) are plan views of a volleyball court. In the example of FIG. 12 and FIG. 13, the imaging device 2 is installed in the center of a court 400. The situation in the court 400 at the time point t1 is shown in FIG. 12(*a*), and a first frame photographed at the time point t1 (hereinafter referred to as a "first omnidirectional image 500") is shown in FIG. 12(*b*). It will be supposed that, at this time, the image generation unit 30 recognizes a photographic subject 403 (which hereinafter will be referred to as a "third photographic subject 403") that is a person as being the main photographic subject. Accordingly, according to the step S35 in the flow chart of FIG. 8, the image generation unit 30 creates a two dimensional image (i.e. a frame) that includes this third photographic subject 403.

And the situation in the court 400 at the time point t2 subsequent to the time point t1 is shown in FIG. 13(*a*), and a 31st frame photographed at the time point t2 (hereinafter referred to as a "second omnidirectional image 510") is shown in FIG. 13(*b*). At this time, the third photographic subject 403 which was the main photographic subject at the time point t1 as described above, and a main photographic subject 404 which is a person (and which hereinafter will be referred to as a "fourth photographic subject 404") and a main photographic subject 405 which is a person (and which hereinafter will be referred to as a "fifth photographic subject 405") at the time point t2 are present in the court 400. Thus, it will be supposed that the image generation unit 30 specifies the fourth photographic subject 404 and the fifth photographic subject 405 as being the two main photographic subjects. It will be supposed that, at the time point t2, the third photographic subject 403 is not specified as being a main photographic subject.

The positional relationship between the imaging device 2, the fourth photographic subject 404, and the fifth photographic subject 405 is the same as in the example shown in FIG. 6. In other words, in FIG. 13(b), due to control to shift the part of the second omnidirectional image 510 displayed upon the display unit 40 in the leftward direction, the distance by which the image displayed upon the display unit 40 shifts from when the fourth photographic subject 404 is displayed upon the display unit 40 until the fifth photographic subject 405 is displayed upon the display unit 40 (i.e. the distance in the rightward direction from the fourth photographic subject 404 to the fifth photographic subject 405 (hereinafter this will be termed the "first distance")) is longer than the distance in the rightward direction from the fifth photographic subject 405 until the fourth photographic subject 404 (hereinafter this will be termed the "second distance"). Accordingly, if it is supposed that a two dimensional image is created from the second omnidirectional image 510 by performing processing similar to that performed in the first embodiment, then a two dimensional image will be created in which the fifth photographic subject 405 is positioned on the left side of the fourth photographic subject 404.

By contrast, the image generation unit 30 of this embodiment generates a two dimensional image while considering the position of the main photographic subject in the previous frame in time, in other words in the first omnidirectional image 500 that was captured at the time point t1 shown in FIG. 12(b). In concrete terms, the image generation unit 30 specifies an angle of view 401 that is the angle of view including the main photographic subject (i.e. the third photographic subject 403) at the time point t1. And the image generation unit 30 specifies a partial image 511 at the position corresponding to the angle of view 401 from the second omnidirectional image 510 that was captured at the time point t2. Then the image generation unit 30 creates a two dimensional image in which the fourth photographic subject 404 and the fifth photographic subject 405 are arranged, on the basis of the positional relationship between the partial image 511, the fourth photographic subject 404, and the fifth photographic subject 405 in the second omnidirectional image 510.

The processing performed by the image generation unit 30 to create a two dimensional image will now be described in detail. The image generation unit 30 defines hypothetically, in the second omnidirectional image, a partial image 511 at a position corresponding to the partial image including the third photographic subject 403 in the first omnidirectional image (in other words, a partial image in the second omnidirectional image corresponding to the angle of view 401, hereinafter termed a "first partial image 511"). And the image generation unit 30 defines hypothetically a partial image in which the fourth photographic subject 404, the fifth photographic subject 405, and the first partial image 511 between the fourth photographic subject 404 and the fifth photographic subject 405 are included (in other words, a partial image in the second omnidirectional image corresponding to an angle of view 406, hereinafter termed a "second partial image"). Then the image processing unit 30 creates a two dimensional image such that the left and right positional relationship of the fourth photographic subject 404 and the fifth photographic subject 405 in the second partial image is maintained.

Now, it should be understood that the reason why the two dimensional image is generated while considering the position of the main photographic subject in the first omnidirectional image 500 that was captured at the time point t1 is as follows. The image generation unit 30 generates a two dimensional image (i.e. a frame) including the third photographic subject 403 from the first omnidirectional image 500 that was captured at the time point t1. That is, over a predetermined time period, the user views the direction corresponding to the angle of view 401 as the video image reproduced from the two dimensional video. Then, at the time point t2, the main photographic subject changes from the third photographic subject 403 to the fourth photographic subject 404 and the fifth photographic subject 405. As a result, the image generation unit 30 generates a two dimensional image (i.e. a frame) including the fourth photographic subject 404 and the fifth photographic subject 405 from the second omnidirectional image 510 captured at the time point t2. This is because, from the point of view of a user who has viewed the direction corresponding to the angle of view 401 for the predetermined period as the video image reproduced from the two dimensional video, it is easier to understand the arrangement of the photographic subjects in three dimensional space by arranging the fourth photographic subject 404 and the fifth photographic subject 405 while taking the position of the third photographic subject 403 (in other words, the direction corresponding to the angle of view 401) as reference. In other words, in FIG. 13(a), when the direction of the angle of view 401 as viewed from the imaging device 2 is taken as reference, the fourth photographic subject 404 is present on the left and the fifth photographic subject 405 is present on the right. Accordingly, during reproduction of the two dimensional video, when changing over from the two dimensional image (i.e. the frame) that includes the third photographic subject 403 to the two dimensional image (i.e. the frame) that includes the fourth photographic subject 404 and the fifth photographic subject 405, by arranging the fourth photographic subject 404 on the left and the fifth photographic subject on the right in the two dimensional image, it is possible to reduce any sense of discomfort imparted to the user.

By determining the angle of view in consideration of the angle of view of the previous frame in time in this manner, it is possible to avoid confusion during viewing due to a sudden change of scene. In other words, if reproduction is suddenly performed in a direction that is completely different from that of the previous frame, then there is a possibility that it may become difficult to know from which portion of the omnidirectional image the screen has been cut out. However since, as described above, the image generation unit 30 of this embodiment determines the angle of view in consideration of the angle of view of the previous frame, accordingly it becomes possible to create a two dimensional video in which the spatial relationships can be easily apprehended, and that accordingly is suitable for viewing It should be understood that "the left and right positional relationship is maintained" means that only the positional relationship in the left and right direction is considered and its relationship is maintained while ignoring the up and down positional relationship. In other words the left and right positional relationship is considered to be maintained as long as the left and right positional relationship is maintained, regardless of how much the up and down positional relationship changes.

According to the embodiment described above, the following advantageous operational effect is obtained.

(1) According to the structure of this embodiment, it is possible automatically to generate a two dimensional image that is suitable for viewing from the omnidirectional image.

Variant of Third Embodiment

It should be understood that a single device may incorporate two or more of the imaging unit 20, the image generation unit 30, and the display unit 40. For example, the imaging device 2 may incorporate the image generation unit 30 in addition to the imaging unit 20. In this case, the imaging device 2 would also fulfil the role of the image processing device 3. Accordingly, the image processing device 3 may not be included in the image processing system 1. And, as another example, the image processing device 3 may incorporate the display unit 40 in addition to the image generation unit 30. In this case, the image processing device 3 would also fulfil the role of the reproduction device 4. Accordingly, the reproduction device 4 may not be included in the image processing system 1. As another example, in addition to the imaging unit 20, the imaging device 2 may also include the image generation unit 30 and the display unit 40. In this case, the imaging device 2 would also fulfil the roles of the image processing device 3 and the reproduction device 4. In other words, the imaging device 2 would, by itself, provide functions equivalent to those of the image processing system 1.

FIG. 10 is a block diagram schematically showing an electronic device 1000 that combines the image processing device 3 and the reproduction device 4. This electronic device 1000 may be, for example, a smart phone or a tablet terminal. The electronic device 1000 comprises an image generation unit 30, an input unit 31, an output unit 32, a display unit 40, a control unit 42, and an actuation unit 43. The electronic device 1000 is capable of creating a two dimensional video, reproducing upon the display unit 40 a two dimensional video that has been created, storing upon the storage medium 52 a two dimensional video that has been created, and performing reproduction of an omnidirectional video upon the display unit 40. It should be understood that the operation of each of these sections of the electronic device 1000 is the same as in the case of the first embodiment, and accordingly explanation thereof will be omitted.

According to the variant embodiment described above, the following advantageous operational effect is obtained.

(2) According to the structure of this embodiment, it is possible to obtain advantageous operational effects similar to those of the embodiments described above.

It should be understood that the creation of a two dimensional video by the image generation unit 30 may be performed in real time in parallel with the creation of the omnidirectional video by the imaging unit 20, or may be started after the creation of the omnidirectional video has been completed. In a similar manner, the display of the two dimensional video upon the display unit 40 may be performed in real time in parallel with the creation of the two dimensional video by the image generation unit 30, or may be started after the creation of the two dimensional video has been completed.

According to the variant embodiment described above, the following advantageous operational effect is obtained.

(3) According to the structure of this embodiment, it is possible automatically to generate a two dimensional image that is suitable for viewing from the all-around image.

Although an example has been explained in which two photographic subjects arranged along the left and right direction are present, the same would be the case if two photographic subjects are present and are arranged along some direction other than the left and right direction. Furthermore, if the main photographic subject shifts, not only in the left and right direction but also in the up and down direction, it would be acceptable to create a two dimensional image in which the up and down positional relationship is maintained, instead of the left and right positional relationship being maintained.

The disclosure of the following application, from which priority is claimed, is incorporated herein by reference:

Japanese Patent Application No. 2017-48861 (filed on Mar. 14, 2017).

REFERENCE SIGNS LIST

1: image processing system, 2: imaging device, 3: image processing device, 4: reproduction device, 20: imaging unit, 30: image generation unit, 31: input unit, 40: display unit, 42: control unit.

The invention claimed is:

1. An image processing device, comprising:
an input unit through which are inputted first image data which is a portion of an image in which a first photographic subject and a second photographic subject are imaged, and which is employed for the second photographic subject to be displayed after the first photographic subject has been displayed, and for the first photographic subject then again to be displayed upon a display unit by repeating a control operation to shift a portion of the image displayed upon the display unit in a first direction to cause subsequent display of a portion of the image that is not currently displayed upon the display unit; and
an image generation unit that generates, from the first image data, second image data in which the first photographic subject and the second photographic subject are arranged based on an orientation of the first photographic subject, the second image data simultaneously displaying both the first photographic subject and the second photographic subject in the image displayed upon the display unit.

2. The image processing device according to claim 1, wherein:
the image generation unit generates, from the first image data, the second image data that includes the first photographic subject and the second photographic subject arranged such that the first photographic subject faces toward the second photographic subject.

3. An image processing device, comprising:
an input unit through which are inputted first image data which is a portion of an image in which a first photographic subject and a second photographic subject are imaged, and which is employed for the second photographic subject to be displayed after the first photographic subject has been displayed, and for the first photographic subject then again to be displayed upon a display unit by repeating a control operation to shift a portion of the image displayed upon the display unit in a first direction to cause subsequent display of a portion of the image that is not currently displayed upon the display unit; and
an image generation unit that generates, from the first image data, second image data that includes the first photographic subject and the second photographic subject arranged such that the first photographic subject faces toward the second photographic subject, the second image data simultaneously displaying both the first photographic subject and the second photographic subject in the image displayed upon the display unit, in a case where the first photographic subject is not facing toward the second photographic subject in an image that is displayed from the first image data after the second photographic subject is displayed upon the display unit until the first photographic subject is again displayed upon the display unit.

4. An image processing device, comprising:
an input unit through which is inputted an all-around image including a first photographic subject and a second photographic subject that have been imaged by an imaging unit; and
an image generation unit that generates, from the all-around image, an image in which the first photographic subject and the second photographic subject are simultaneously displayed and arranged such that the first photographic subject faces toward the second photographic subject based on an orientation of the first photographic subject in the all-around image.

5. The image processing device according to claim 4, wherein:
the image generation unit generates, from the all-around image, the image in which the first photographic subject and the second photographic subject are simultaneously displayed and arranged such that the first photographic subject faces toward the second photographic subject in a case where the first photographic subject is not facing toward the second photographic subject in a partial image of the all-around image, the partial image including the first photographic subject, the second photographic subject, and a shortest path from the first photographic subject to the second photographic subject.

6. An electronic device, comprising:
a display unit that displays an image in which a first photographic subject and a second photographic subject are imaged;
a control unit that causes the display unit to display the second photographic subject after the first photographic subject has been displayed, and to then again display the first photographic subject upon the display unit, by repeating a control operation to shift a portion of the image displayed upon the display unit in a first direction to cause subsequent display of a portion of the image that is not currently displayed upon the display unit; and
an image generation unit that generates image data in which the first photographic subject and the second photographic subject are arranged based on an orientation of the first photographic subject, the image data simultaneously displaying both the first photographic subject and the second photographic subject upon the display unit.

7. The electronic device according to claim 6, wherein:
the image generation unit generates the image data that includes the first photographic subject and the second photographic subject arranged such that the first photographic subject faces toward the second photographic subject.

* * * * *